US007797531B2

(12) United States Patent
Suzuki

(10) Patent No.: US 7,797,531 B2
(45) Date of Patent: Sep. 14, 2010

(54) WIRELESS AD-HOC COMMUNICATION SYSTEM, TERMINAL, METHOD FOR SUGGESTING ISSUANCE OF ATTRIBUTE CERTIFICATE AND METHOD FOR REQUESTING ISSUANCE OF ATTRIBUTE CERTIFICATE IN THE TERMINAL, AND PROGRAM FOR CAUSING THE TERMINAL TO EXECUTE THE METHOD

(75) Inventor: Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 1043 days.

(21) Appl. No.: 10/508,137

(22) PCT Filed: Feb. 3, 2004

(86) PCT No.: PCT/JP2004/001072

§ 371 (c)(1),
(2), (4) Date: Sep. 17, 2004

(87) PCT Pub. No.: WO2004/071123

PCT Pub. Date: Aug. 19, 2004

(65) Prior Publication Data

US 2005/0159134 A1 Jul. 21, 2005

(30) Foreign Application Priority Data

Feb. 3, 2003 (JP) ............................. 2003-026544

(51) Int. Cl.
*H04L 29/06* (2006.01)
(52) U.S. Cl. ..................................... 713/156
(58) Field of Classification Search ................. 713/156, 713/165
See application file for complete search history.

(56) References Cited

U.S. PATENT DOCUMENTS

2002/0132584 A1* 9/2002 Izumi .......................... 455/41

2002/0143855 A1* 10/2002 Traversat et al. ............ 709/202
2003/0217289 A1* 11/2003 Ammon et al. ............. 713/201

FOREIGN PATENT DOCUMENTS

JP 2000-341323 12/2000

(Continued)

OTHER PUBLICATIONS

U.S. Appl. No. 10/784,271, filed Feb. 24, 2004, Suzuki et al.
U.S. Appl. No. 10/767,371, filed Jan. 30, 2004, Suzuki.
U.S. Appl. No. 10/784,271, filed Feb. 24, 2004, Suzuki, et al.
U.S. Appl. No. 10/792,798, filed Mar. 5, 2004, Saito, et al.
U.S. Appl. No. 10/509,872, filed Oct. 1, 2004, Suzuki.

(Continued)

*Primary Examiner*—Benjamin E Lanier
*Assistant Examiner*—Cordelia Zecher
(74) *Attorney, Agent, or Firm*—Oblon, Spivak, McClelland, Maier & Neustadt, L.L.P.

(57) ABSTRACT

A wireless ad-hoc communication system in which an attribute certificate can be independently and dispersedly issued is provided. A terminal (B200) transmits a beacon (2011) for participating in a network in the wireless ad-hoc communication system. The beacon (2011) indicates whether or not the terminal (B200) has an attribute certificate. Upon receiving the beacon (2011), a terminal (A100) checks the beacon. If it is determined that the terminal (B200) does not have an attribute certificate, the terminal (A100) transmits an attribute-certificate issuance suggestion message (1032) for suggesting an attribute-certificate issuing request to the terminal (B200). When the terminal (B200) transmits an attribute-certificate issuance request message (2041) in response to this message, the terminal (A100) transmits an attribute-certificate issuance message (1052) to the terminal (B200).

34 Claims, 30 Drawing Sheets

FOREIGN PATENT DOCUMENTS

| | | |
|---|---|---|
| JP | 2001-209313 | 8/2001 |
| JP | 2001-313979 | 11/2001 |
| JP | 2002-215585 | 8/2002 |
| WO | 01/22661 | 3/2001 |
| WO | WO0131836 A2 * | 3/2001 |
| WO | 01/31836 | 5/2001 |

OTHER PUBLICATIONS

U.S. Appl. No. 11/567,067, filed Dec. 5, 2006, Suzuki.
U.S. Appl. No. 11/742,989, filed May 1, 2007, Suzuki, et al.

* cited by examiner

FIG. 2

| TERMINAL IDENTIFIER #1 | PUBLIC KEY CERTIFICATE #1 |
|---|---|
| TERMINAL IDENTIFIER #2 | PUBLIC KEY CERTIFICATE #2 |
| ⋮ | ⋮ |

FIG. 5

| ATTRIBUTE CERTIFICATE IDENTIFIER #1 | REVOCATION TIME #1 |
|---|---|
| ATTRIBUTE CERTIFICATE IDENTIFIER #2 | REVOCATION TIME #2 |
| ⋮ | ⋮ |

WIRELESS AD-HOC COMMUNICATION SYSTEM, TERMINAL, METHOD FOR SUGGESTING ISSUANCE OF ATTRIBUTE CERTIFICATE AND METHOD FOR REQUESTING ISSUANCE OF ATTRIBUTE CERTIFICATE IN THE TERMINAL, AND PROGRAM FOR CAUSING THE TERMINAL TO EXECUTE THE METHOD

TECHNICAL FIELD

The present invention relates to a wireless ad-hoc communication system. More particularly, the present invention relates to a wireless ad-hoc communication system in which access rights to a network are authenticated using a terminal-authorization-certificate, a terminal in this system, a processing method in them, and a program that causes a computer (or a terminal) to execute this method.

BACKGROUND ART

With the compactness, high performance, and portability of electronic devices, there have been demanded environments where terminals are connected to a network at any location, if necessary, to perform communication. A network that is temporarily established, if necessary, called wireless ad-hoc network technology, has been developed. In a wireless ad-hoc network, no particular access point is provided, and terminals (e.g., computers, personal digital assistances (PDAs), portable phones, etc.) that are independently and dispersedly-located are connected with one another.

In order to prevent unauthorized devices from accessing network resources, typically, authorization management is performed using a terminal-authorization-certificate that is a certificate that serves to authorize a terminal to access a network, i.e., a certificate of privilege. One kind of terminal-authorization-certificate is an attribute certificate, which was newly specified by X.509 ver. 3 in March 2000, and the profiles (definitions of the description in data fields contained in an attribute certificate) were collectively defined in the Standard Track RFC (Request For Comments) in April 2002. An attribute certificate is used as an access license to network resources to check the rights to connect to the network resources, thus allowing only a terminal having access qualifications to connect. In this document, the terminal-authorization-certificate is described in the context of an attribute certificate. However, for example, terminal rights described in an XML language or the like, which are signed by an authorized authority, may function as a terminal-authorization-certificate of the present invention.

In a traditional communication system, data used for authentication is collectively managed by a specific device on a network. For example, there has been suggested a technology in which a single public key management device is shared by a plurality of radio communication exchange systems, and, when a mobile terminal moves into a service area of one of the radio communication exchange systems, the public key management device is requested to send a public key of this mobile terminal (see, for example, Japanese Unexamined Patent Application Publication No. 10-112883 (FIG. 1)).

In a traditional communication system, data used for authentication is collectively managed. In a wireless ad-hoc communication system, however, terminals are always moving, and different terminals set up a network from time to time. Thus, a collective management device does not always exist. Due to the nature of wireless media, a communication path to such a collective management device is not always maintained. Therefore, the wireless ad-hoc communication system is not suitable for collective management.

Accordingly, it is an object of the present invention to independently and dispersedly issue a terminal-authorization-certificate in a wireless ad-hoc communication system. The present invention is particularly useful in a wireless network in which all wireless terminals setting up the network transmit management information (such as a beacon).

DISCLOSURE OF INVENTION

In order to achieve the object, a wireless ad-hoc communication system of the present invention (1) is a wireless ad-hoc communication system constituted by a plurality of terminals, including a first terminal that transmits a signal including beacon information indicating that the first terminal does not have a terminal-authorization-certificate, and a second terminal that gives a suggestion of a terminal-authorization-certificate issuing request to the first terminal in response to the signal. Therefore, advantageously, the signal from the first terminal can act as a trigger to perform a terminal-authorization-certificate issuing process between the first and second terminals.

A terminal of the present invention (2) includes receiving means for receiving a signal including beacon information, and terminal-authorization-certificate issuance suggesting means for, when the receiving means receives a signal including predetermined beacon information from a second terminal, giving a suggestion of a terminal-authorization-certificate issuing request to the second terminal. Therefore, advantageously, the signal including beacon information can act as a trigger to perform a terminal-authorization-certificate issuing process.

A terminal of the present invention (3) further includes, in the terminal of the present invention (2), means for obtaining terminal identification information of the second terminal from the signal received by the receiving means from the second terminal, and the terminal-authorization-certificate issuance suggesting means makes the suggestion based on the terminal identification information. Therefore, advantageously, after confirming the terminal to which a suggestion of a terminal-authorization-certificate issuing request is to be give, the suggestion can be made.

A terminal of the present invention (4) is such that, in the terminal of the present invention (2), the terminal-authorization-certificate issuance suggesting means further provides a public key certificate of the terminal when giving the suggestion of the terminal-authorization-certificate issuing request to the second terminal. Therefore, advantageously, the identity of the terminal that suggests a terminal-authorization-certificate issuing request can be verified by a transmitting terminal of a signal including beacon information.

A terminal of the present invention (5) includes receiving means for receiving a signal including beacon information, and terminal-authorization-certificate issuance suggesting means for, when the receiving means receives a signal including predetermined beacon information from a second terminal, issuing a terminal-authorization-certificate that certifies the second terminal as an owner, and giving a suggestion to the second terminal. Therefore, advantageously, a signal including beacon information can act as a trigger to issue a terminal-authorization-certificate before issuance of the terminal-authorization-certificate is requested.

A terminal of the present invention (6) further includes, in the terminal of the present invention (5), means for obtaining terminal identification information of the second terminal from the signal received by the receiving means from the second terminal, and the terminal-authorization-certificate issuance suggesting means makes the suggestion based on the terminal identification information. Therefore, advantageously, after confirming the terminal to which a suggestion of a terminal-authorization-certificate issuing request is to be given, the terminal-authorization-certificate can be received.

A terminal of the present invention (7) is such that, in the terminal of the present invention (5), the terminal-authorization-certificate issuance suggesting means further provides a public key certificate of the terminal when giving the suggestion of the terminal-authorization-certificate issuing request to the second terminal. Therefore, advantageously, the identity of the terminal that suggests a terminal-authorization-certificate issuing request can be verified by a transmitting terminal of a signal including beacon information.

A terminal of the present invention (8) includes receiving means for receiving a signal including beacon information, and terminal-authorization-certificate issuance suggesting means for, when the receiving means receives a signal including beacon information from a second terminal, giving a suggestion of a terminal-authorization-certificate issuing request to the second-terminal when the signal does not indicate that the second terminal has the terminal-authorization-certificate. Therefore, advantageously, if a transmitting terminal of a signal including beacon information does not have a terminal-authorization-certificate, the signal can act as a trigger to perform a terminal-authorization-certificate issuing process.

A terminal of the present invention (9) further includes, in the terminal of the present invention (8), means for obtaining terminal identification information from the second terminal from the signal received by the receiving means from the second terminal, and the terminal-authorization-certificate issuance suggesting means makes the suggestion based on the terminal identification information. Therefore, advantageously, after confirming the terminal to which a suggestion of a terminal-authorization-certificate issuing request is to be given, the suggestion can be made.

A terminal of the present invention (10) is such that, in the terminal of the present invention (8), the terminal-authorization-certificate issuance suggesting means further provides a public key certificate of the terminal when giving the suggestion of the terminal-authorization-certificate issuing request to the second terminal. Therefore, advantageously, the identity of the terminal that suggests a terminal-authorization-certificate issuing request can be verified by a transmitting terminal of a signal including beacon information.

A terminal of the present invention (11) further includes, in the terminal of the present invention (10), terminal-authorization-certificate issuance request receiving means for receiving a terminal-authorization-certificate issuing request, confirming means for, when the terminal-authorization-certificate issuance request receiving means receives a terminal-authorization-certificate issuing request from the second terminal, displaying information about the second terminal to prompt confirmation, and terminal-authorization-certificate issuing means for issuing a terminal-authorization-certificate to the second terminal when the confirmation is successfully performed, and notifying the second terminal of a rejection of the terminal-authorization-certificate issuing request when the confirmation is rejected. Therefore, advantageously, a terminal-authorization-certificate can be issued after confirming a terminal-authorization-certificate issuance requesting terminal.

A terminal of the present invention (12) further includes, in the terminal of the present invention (11), a terminal-authorization-certificate-issuing-terminal list table that stores a public key certificate of a terminal-authorization-certificate issuing terminal, and the terminal-authorization-certificate issuing means transmits the public key certificate of the terminal-authorization-certificate issuing terminal stored in the terminal-authorization-certificate-issuing-terminal list table to the second terminal when issuing the terminal-authorization-certificate. Therefore, advantageously, the second terminal can easily verify the terminal-authorization-certificate.

A terminal of the present invention (13) further includes, in the terminal of the present invention (11), a terminal-authorization-certificate revocation list table that stores a terminal-authorization-certificate revocation list, and the terminal-authorization-certificate issuing means transmits the terminal-authorization-certificate revocation list stored in the terminal-authorization-certificate revocation list table to the second terminal when issuing the terminal-authorization-certificate. Therefore, advantageously, the terminal-authorization-certificate that has been revoked when the terminal-authorization-certificate verified by the second terminal can be eliminated.

A terminal of the present invention (14) includes receiving means for receiving a signal including beacon information, and terminal-authorization-certificate issuance suggesting means for, when the receiving means receives a signal including beacon information from a second terminal, issuing a terminal-authorization-certificate that certifies the second terminal as an owner and giving a suggestion to the second terminal when the signal does not indicate that the second terminal has the terminal-authorization-certificate. Therefore, advantageously, if a transmitting terminal of a signal including beacon information does not have a terminal-authorization-certificate, the signal can act as a trigger to issue a terminal-authorization-certificate before issuance of the terminal-authorization-certificate is requested.

A terminal of the present invention (15) further includes, in the terminal of the present invention (14), means for obtaining terminal identification information of the second terminal from the signal received by the receiving means from the second terminal, and the terminal-authorization-certificate issuance suggesting means makes the suggestion based on the terminal identification information. Therefore, advantageously, after confirming the terminal to which a suggestion of a terminal-authorization-certificate issuing request is to be given, the terminal-authorization-certificate can be received.

A terminal of the present invention (16) is such that, in the terminal of the present invention (14), the terminal-authorization-certificate issuance suggesting means further provides a public key certificate of the terminal when giving the suggestion of the terminal-authorization-certificate issuing request to the second terminal. Therefore, advantageously, the identity of the terminal that suggests a terminal-authorization-certificate issuing request can be verified by a transmitting terminal of a signal including beacon information.

A terminal of the present invention (17) includes terminal-authorization-certificate issuance suggestion receiving means for receiving a suggestion of a terminal-authorization-certificate issuing request in response to the signal, confirming means for, when the terminal-authorization-certificate issuance suggestion receiving means receives the suggestion from a second terminal, displaying information about the second terminal to prompt confirmation, and terminal-authorization-certificate issuance requesting means for requesting the second terminal to issue a terminal-authorization-certificate when the confirmation is successfully performed, and notifying the second terminal of a rejection of the terminal-authorization-certificate issuance suggestion when the confirmation is rejected. Therefore, advantageously, issuance of a terminal-authorization-certificate can be requested after confirming a terminal-authorization-certificate issuing terminal.

A terminal of the present invention (18) is such that, in the terminal of the present invention (17), the terminal-authorization-certificate issuance requesting means further provides a public key certificate of the terminal when requesting the second terminal to issue a terminal-authorization-certificate. Therefore, advantageously, the identity of the terminal that makes a request to issue the terminal-authorization-certificate can be confirmed by a terminal-authorization-certificate issuing terminal.

A terminal of the present invention (19) includes transmitting means for transmitting a signal including beacon information indicating that the terminal does not have a terminal-authorization-certificate, terminal-authorization-certificate issuance suggestion receiving means for receiving a suggestion of a terminal-authorization-certificate issuing request in response to the signal, confirming means for, when the terminal-authorization-certificate issuance suggestion receiving means receives the suggestion from a second terminal, displaying information about the second terminal to prompt confirmation, and terminal-authorization-certificate issuance requesting means for, after the confirmation, when the suggestion includes an issued terminal-authorization-certificate, receiving the terminal-authorization-certificate, and when the suggestion does not include an issued terminal-authorization-certificate, requesting the second terminal to issue a terminal-authorization-certificate. Therefore, advantageously, upon receiving a suggestion of a terminal-authorization-certificate issuing request, it can be determined whether or not the suggestion includes an issued terminal-authorization-certificate, and an operation for receiving a terminal-authorization-certificate or an operation for making a request to issue a terminal-authorization-certificate can be performed.

A terminal of the present invention (20) is such that, in the terminal of the present invention (19), the terminal-authorization-certificate issuance requesting means further provides a public key certificate of the terminal when requesting the second terminal to issue a terminal-authorization-certificate. Therefore, advantageously, the identity of the terminal that makes a request to issue a terminal-authorization-certificate can be verified by a terminal-authorization-certificate issuing terminal.

A terminal of the present invention (21) includes receiving means for receiving a signal including beacon information, and terminal-authorization-certificate issuance requesting means for, when the receiving means receives a signal including predetermined beacon information from a second terminal, requesting the second terminal to issue a terminal-authorization-certificate. Therefore, advantageously, issuance of a terminal-authorization-certificate can be requested in response to a signal including beacon information.

A terminal of the present invention (22) further includes, in the terminal of the present invention (21), means for obtaining terminal identification information of the second terminal from the signal received by the receiving means from the second terminal, and the terminal-authorization-certificate issuance requesting means makes the suggestion based on the terminal identification information. Therefore, advantageously, after confirming the terminal to which a request to issue a terminal-authorization-certificate is to be sent, the request can be performed.

A terminal of the present invention (23) includes a terminal-authorization-certificate table that stores a first terminal-authorization-certificate indicating access rights of the terminal, receiving means for receiving a signal including beacon information, and authentication requesting means for, when the receiving means receives a signal including beacon information from a second terminal, providing the first terminal-authorization-certificate stored in the terminal-authorization-certificate table and requesting the second terminal to authenticate the terminal when the signal indicates that the second terminal has a second terminal-authorization-certificate indicating access rights of the second terminal. Therefore, advantageously, a signal including beacon information from another terminal having a terminal-authorization-certificate can act as a trigger to perform a mutual authentication process based on the terminal-authorization-certificate.

A terminal of the present invention (24) further includes, in the terminal of the present invention (23), a terminal-authorization-certificate-issuing-terminal list table that stores a public key certificate of a terminal-authorization-certificate issuing terminal, authentication request receiving means for receiving a second authentication request made by the second terminal in response to the authentication request of the authentication requesting means, and verifying means for verifying the second terminal-authorization-certificate included in the second authentication request received by the authentication request receiving means using a public key included in the public key certificate stored in the terminal-authorization-certificate-issuing-terminal list table. Therefore, advantageously, a terminal-authorization-certificate indicating access rights of a transmitting terminal of a signal including beacon information can be verified by a receiving terminal of the signal.

A terminal of the present invention (25) further includes, in the terminal of the present invention (24), a terminal-authorization-certificate revocation list table that stores a terminal-authorization-certificate revocation list, and the verifying means determines an authentication error when the second terminal-authorization-certificate has been revoked in the terminal-authorization-certificate revocation list stored in the terminal-authorization-certificate revocation list table. Therefore, advantageously, the terminal-authorization-certificate that has been revoked when the terminal-authorization-certificate is verified by the terminal can be eliminated.

A terminal of the present invention (26) includes a terminal-authorization-certificate-issuing-terminal list table that stores a public key certificate of a terminal-authorization-certificate issuing terminal, transmitting means for transmitting a signal including beacon information indicating that the terminal has a second terminal-authorization-certificate to a second terminal having a first terminal-authorization-certificate, a terminal-authorization-certificate table that stores the second terminal-authorization-certificate indicating access rights of the terminal, authentication-request receiving means for receiving a first authentication request from the second terminal in response to the signal, verifying means for verifying the first terminal-authorization-certificate included in the first authentication request received by the authentication request receiving means using a public key included in the public key certificate stored in the terminal-authorization-certificate-issuing-terminal list table, and authentication requesting means for, when the verifying means determines an authentication success, providing the second terminal-authorization-certificate stored in the terminal-authorization-certificate table to the second terminal and performing a second authentication request for requesting the second terminal to authenticate the terminal. Therefore, advantageously, a signal including beacon information indicating that a terminal-authorization-certificate is present can act as a trigger to perform a mutual authentication process based on the terminal-authorization-certificate.

A terminal of the present invention (27) further includes, in the terminal of the present invention (26), a terminal-authorization-certificate revocation list table that stores a terminal-authorization-certificate revocation list, and the verifying means determines an authentication error when the second terminal-authorization-certificate has been revoked in the terminal-authorization-certificate revocation list stored in the terminal-authorization-certificate revocation list table. Therefore, advantageously, the terminal-authorization-certificate that has been revoked when the terminal-authorization-certificate is verified by the terminal can be eliminated.

A method for suggesting issuance of a terminal-authorization-certificate according to the present invention (28) includes the steps of receiving a signal including beacon information, and, when the signal does not indicate that a transmitting terminal of the signal has a terminal-authorization-certificate, giving a suggestion of a terminal-authorization-certificate issuing request to the transmitting terminal. Therefore, advantageously, if a transmitting terminal of a signal including beacon information does not have a terminal-authorization-certificate, the signal can act as a trigger to perform a terminal-authorization-certificate issuing process.

A method for suggesting issuance of a terminal-authorization-certificate according to the present invention (29) further includes the step of, in the method of the present invention (28), obtaining terminal identification information of the other terminal from the signal from the second terminal, and the suggestion is made based on the terminal identification information. Therefore, advantageously, after confirming the terminal to which a suggestion of a terminal-authorization-certificate issuing request is to be given, the suggestion can be made.

A method for suggesting issuance of a terminal-authorization-certificate according to the present invention (30) includes the steps of receiving a signal including beacon information, when the signal does not indicate that a transmitting terminal of the signal has a terminal-authorization-certificate, issuing a terminal-authorization-certificate that certifies the transmitting terminal as an owner and giving a suggestion to the transmitting terminal. Therefore, advantageously, if a transmitting terminal of a signal including beacon information does not have a terminal-authorization-certificate, the signal can act as a trigger to issue a terminal-authorization-certificate before issuance of the terminal-authorization-certificate is requested.

A method for requesting issuance of a terminal-authorization-certificate according to the present invention (31) includes the steps of transmitting a signal including beacon information indicating that a terminal-authorization-certificate is not present, receiving a suggestion of a terminal-authorization-certificate issuing request in response to the signal, displaying information about a transmitting terminal of the suggestion to prompt confirmation, and requesting the transmitting terminal to issue a terminal-authorization-certificate when the confirmation is successfully performed and notifying the transmitting terminal of a rejection of the terminal-authorization-certificate issuance suggestion when the confirmation is rejected. Therefore, advantageously, issuance of a terminal-authorization-certificate can be requested after confirming a terminal-authorization-certificate issuing terminal.

A method for requesting issuance of a terminal-authorization-certificate according to the present invention (32) includes the step of transmitting a signal including beacon information indicating that a terminal-authorization-certificate is not present, receiving a suggestion of a terminal-authorization-certificate issuing request in response to the signal, displaying information about a transmitting terminal of the suggestion to prompt confirmation, and after the confirmation, when the suggestion includes an issued terminal-authorization-certificate, receiving the terminal-authorization-certificate, and when the suggestion does not include an issued terminal-authorization-certificate, requesting the transmitting terminal to issue a terminal-authorization-certificate. Therefore, advantageously, upon receiving a suggestion of a terminal-authorization-certificate issuing request, it can be determined whether or not the suggestion includes an issued terminal-authorization-certificate, and an operation for receiving a terminal-authorization-certificate or an operation for requesting issuance of a terminal-authorization-certificate can be performed.

A method for requesting issuance of a terminal-authorization-certificate according to the present invention (33) includes the steps of receiving a signal including beacon information, and upon receiving the signal from another terminal, requesting the other terminal to issue a terminal-authorization-certificate. Therefore, advantageously, issuance of a terminal-authorization-certificate can be requested in response to a signal including beacon information.

A method for requesting issuance of a terminal-authorization-certificate according to the present invention (34) further includes the step of, in the method of the present invention (33), obtaining terminal identification information of the other terminal from the signal from the other terminal, and the request is performed based on the terminal identification information. Therefore, advantageously, after confirming the terminal to which a request to issue a terminal-authorization-certificate is to be sent, the request can be performed.

A program of the present invention (35) causes a terminal to execute the steps of receiving a signal including beacon information, and when the signal does not indicate that a transmitting terminal of the beacon has a terminal-authorization-certificate, giving a suggestion of a terminal-authorization-certificate issuing request to the transmitting terminal. Therefore, advantageously, if a transmitting terminal of a signal including beacon information does not have a terminal-authorization-certificate, the signal can act as a trigger to perform a terminal-authorization-certificate issuing process.

A program of the present invention (36) causes a terminal to execute the steps of receiving a signal including beacon information, and when the signal does not indicate that a transmitting terminal of the signal has a terminal-authorization-certificate, issuing a terminal-authorization-certificate that certifies the transmitting terminal as an owner and giving a suggestion to the transmitting terminal. Therefore, advantageously, if a transmitting terminal of a signal including beacon information does not have a terminal-authorization-certificate, the signal can act as a trigger to issue a terminal-authorization-certificate before issuance of the terminal-authorization-certificate is requested.

A program of the present invention (37) causes a terminal to execute the steps of transmitting a signal including beacon information indicating that a terminal-authorization-certificate is not present, receiving a suggestion of a terminal-authorization-certificate issuing request in response to the signal, displaying information about a transmitting terminal of the suggestion to prompt confirmation, and requesting the transmitting terminal to issue a terminal-authorization-certificate when the confirmation is successfully performed, and notifying the transmitting terminal of a rejection of the terminal-authorization-certificate issuance suggestion when the confirmation is rejected. Therefore, advantageously, issuance of a terminal-authorization-certificate can be requested after confirming a terminal-authorization-certificate issuing terminal.

A program of the present invention (38) causes a terminal to execute the steps of transmitting a signal including beacon information indicating that a terminal-authorization-certificate is not present, receiving a suggestion of a terminal-authorization-certificate issuing request in response to the signal, displaying information about a transmitting terminal of the suggestion to prompt confirmation, and after the confirmation, when the suggestion includes an issued terminal-authorization-certificate, receiving the terminal-authorization-certificate, and when the suggestion does not include an issued terminal-authorization-certificate, requesting the transmitting terminal to issue a terminal-authorization-certificate. Therefore, advantageously, upon receiving a suggestion of a terminal-authorization-certificate issuing request, it can be determined whether or not the suggestion includes an issued terminal-authorization-certificate, and an operation for receiving a terminal-authorization-certificate or an operation for making a request to issue a terminal-authorization-certificate can be performed.

A program of the present invention (39) causes a terminal to execute the steps of receiving a signal including beacon information, and upon receiving the signal from a second terminal, requesting the second terminal to issue a terminal-authorization-certificate. Therefore, advantageously, issuance of a terminal-authorization-certificate can be requested in response to a signal including beacon information.

According to the present invention, a wireless ad-hoc communication system can achieve a great advantage that a terminal-authorization-certificate can be independently and dispersedly issued.

BRIEF DESCRIPTION OF THE DRAWINGS

FIG. 2 is an illustration showing an example structure of an attribute-certificate-issuing-terminal list table 610 according to the embodiment of the present invention.

FIG. 5 is an illustration showing an example structure of an attribute-certificate revocation list table 630 according to the embodiment of the present invention.

BEST MODE FOR CARRYING OUT THE INVENTION

An embodiment of the present invention will now be described in detail with reference to the drawings.

Figure 1:
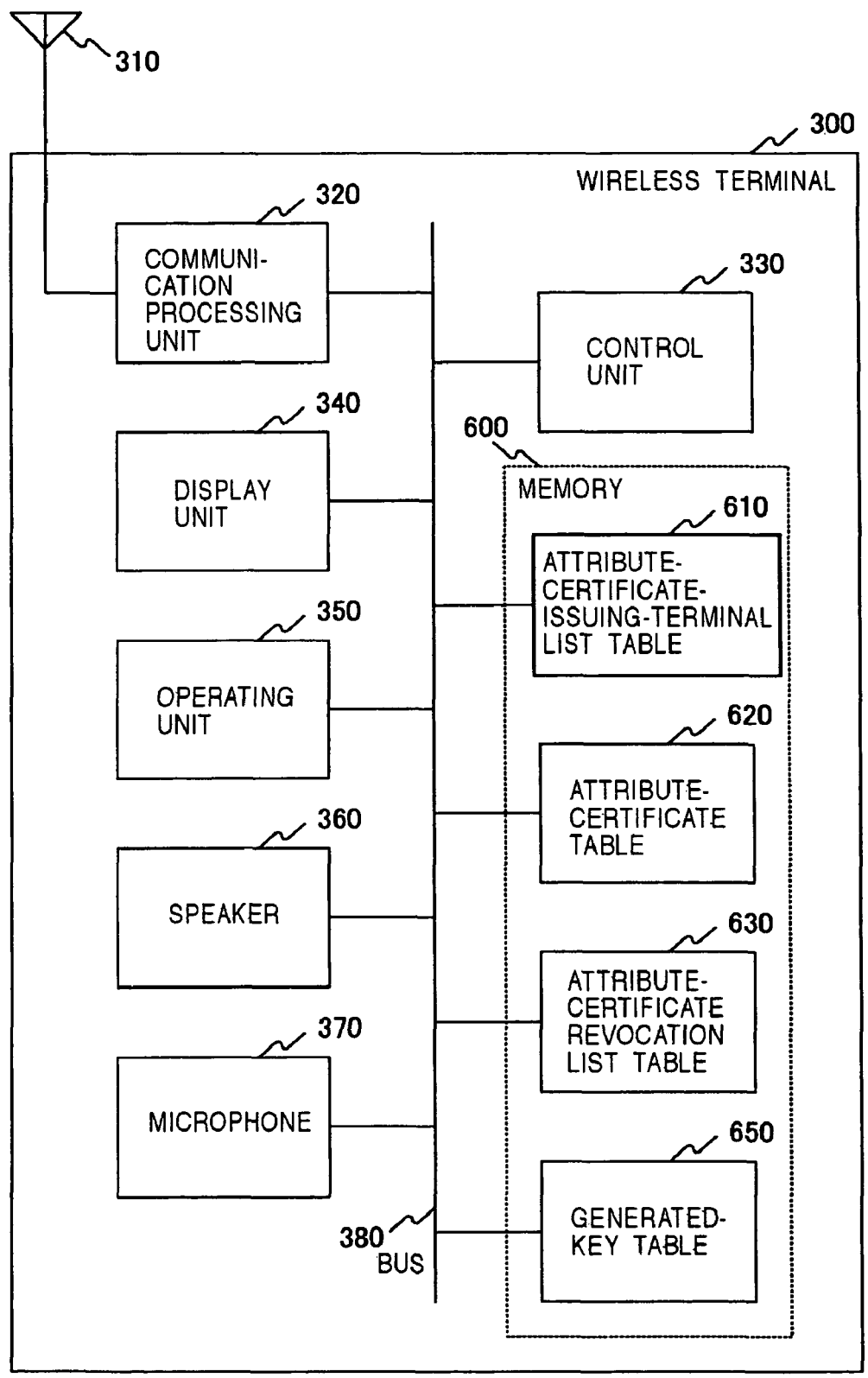
FIG. 1 is a block diagram of a wireless terminal 300 used in a wireless ad-hoc communication system according to an embodiment of the present invention.

FIG. 1 is a block diagram of a wireless terminal 300 used in a wireless ad-hoc communication system according to an embodiment of the present invention. The wireless terminal 300 includes a communication processing unit 320, a control unit 330, a display unit 340, an operating unit 350, a speaker 360, a microphone 370, and a memory 600, and these components are connected via a bus 380. The communication processing unit 320 is connected with an antenna 310. The communication processing unit 320 configures a network interface layer (data link layer) frame from a signal received via the antenna 310. The communication processing unit 320 transmits the network interface layer frame via the antenna 310.

The control unit 330 controls the overall wireless terminal 300. For example, the control unit 330 refers to the frame configured by the communication processing unit 320 to perform predetermined processing. The display unit 340 displays predetermined information, and may be implemented by, for example, a liquid crystal display or the like. The operating unit 350 is operated to enter instructions to the wireless terminal 300 from outside, and may be implemented by, for example, a keyboard, a button switch, or the like. The speaker 360 is used for audio output, and is used to alert the user of the wireless terminal 300 or to exchange audio information with other terminals. The microphone 370 is used for external audio input to the wireless terminal 300, and is used to exchange audio information with other terminals or to instruct operations.

The memory 600 stores an attribute-certificate-issuing-terminal list table 610 including information about attribute certificate issuing terminals, an attribute-certificate table 620 including attribute certificates indicating access rights of the wireless terminal 300, a attribute-certificate revocation list table 630 including information about revoked attribute certificates, a generated-key table 650 including information about generated keys of the wireless terminal 300, that is, a public key, a secret key, and a public key certificate.

FIG. 2 shows an example of the attribute-certificate-issuing-terminal list table 610 according to the embodiment of the present invention. The attribute-certificate-issuing-terminal list table 610 stores information about terminals that have issued an attribute certificate, and includes a public key certificate 612 in association with a terminal identifier 611 of each attribute-certificate issuing terminal. The terminal identifier 611 may be an identifier that uniquely identifies a terminal in a network, and may be represented by, for example, a MAC (Media Access Control) address in the Ethernet®. The public key certificate 612 is a public key certificate of a terminal identified by the corresponding terminal identifier 611. The public key certificate verifies the identity of the certificate owner (subject), and includes a public key of the certificate owner. The public key certificate is signed by a certificate authority (CA) serving as a certificate issuer.

Figure 3:
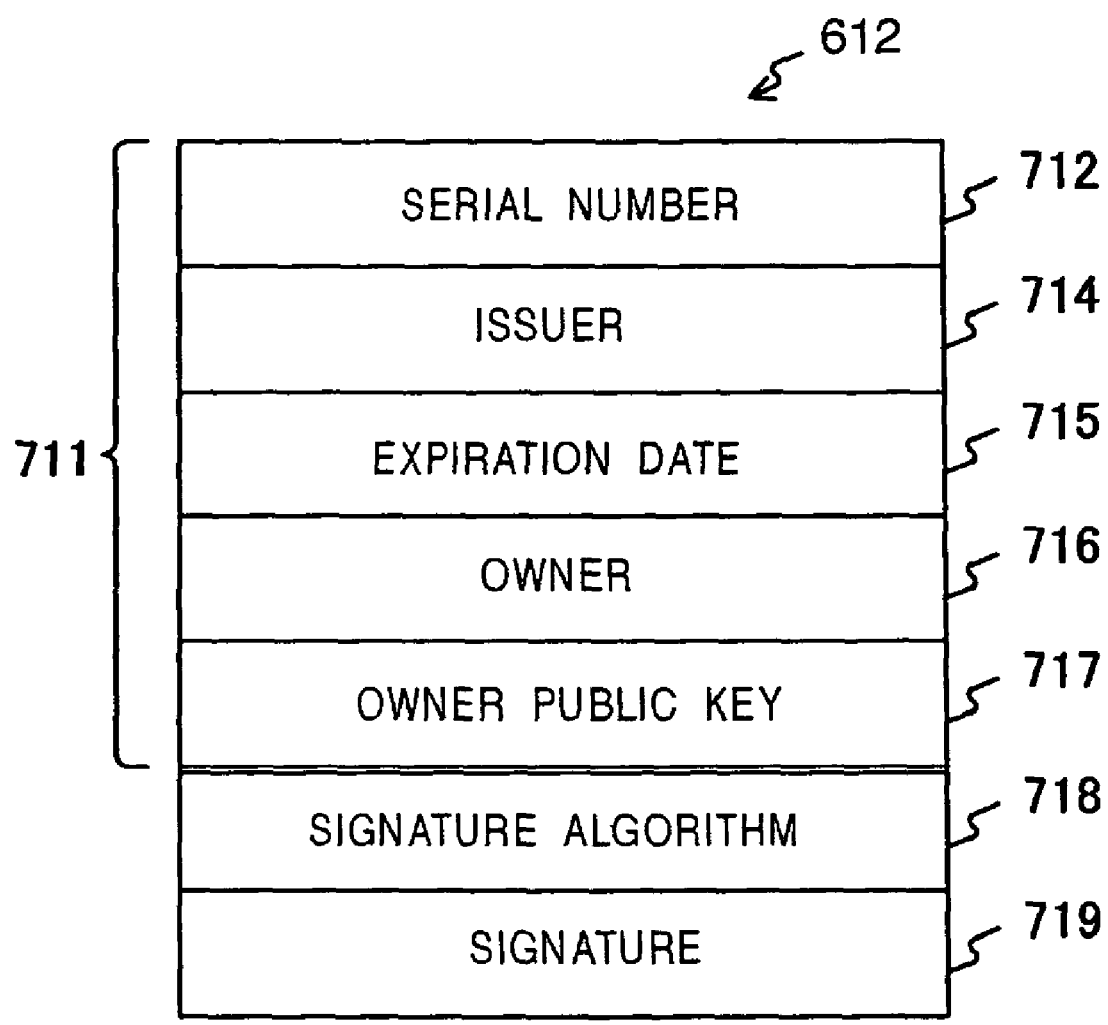
FIG. 3 is a diagram showing a public key certificate 612 stored in an attribute-certificate-issuing-terminal list table 610 according to the embodiment of the present invention.

FIG. 3 is a diagram showing the public key certificate 612 stored in the attribute-certificate-issuing-terminal list table 610. This public key certificate is generally constituted by a pre-signature certificate 711, a signature algorithm 718, and a signature 719. The pre-signature certificate 711 includes a serial number 712, an issuer 714, an expiration date 715, an owner 716, an owner 716, and an owner public key 717.

The serial number 712 represents a serial number of the public key certificate, and is numbered by the certificate authority. The issuer 714 represents the name of the certificate authority serving as a public key certificate issuer. The public key certificate is uniquely identified by the issuer 714 and the serial number 712. The expiration date 715 represents an expiration date of the public key certificate. The owner 716 represents the name of the owner of the public key certificate. The owner public key 717 represents a public key of the owner 716.

The signature 719 represents a signature added to the public key certificate by the certificate authority, and the signature algorithm 718 represents a signature algorithm used for the signature 719. The signature algorithm is constituted by two algorithms, i.e., a message-digest algorithm and a public key encryption algorithm. The message-digest algorithm is one type of hash function (summary function), and is an algorithm by which a message digest of the pre-signature certificate 711 is generated. The message digest is obtained by compressing input data (the pre-signature certificate 711) into a fixed-length bit sequence, and is also referred to as thumbprint, fingerprint, or the like. Known message-digest algorithms include SHA-1 (Secure Hash Algorithm 1), MD2 (Message Digest #2), MD5 (Message Digest #5), and so forth. The public key encryption algorithm is an algorithm by which the message digest obtained by the message-digest algorithm is encrypted using a certificate-authority secret key. Known public key encryption algorithms include RSA based on the prime factorization problem, DSA based on the discrete logarithm problem, and so forth. The message digest of the pre-signature certificate 711 is encrypted using the certificate-authority secret key to produce the signature 719.

The signature 719 of the public key certificate is decoded using a certificate-authority public key to obtain a message digest. The user of the public key certificate generates a message digest of the pre-signature certificate 711, and compares the generated message digest with the message digest decoded by the certificate-authority public key to verify that the content of the pre-signature certificate 711 is not tampered with.

Figure 4:
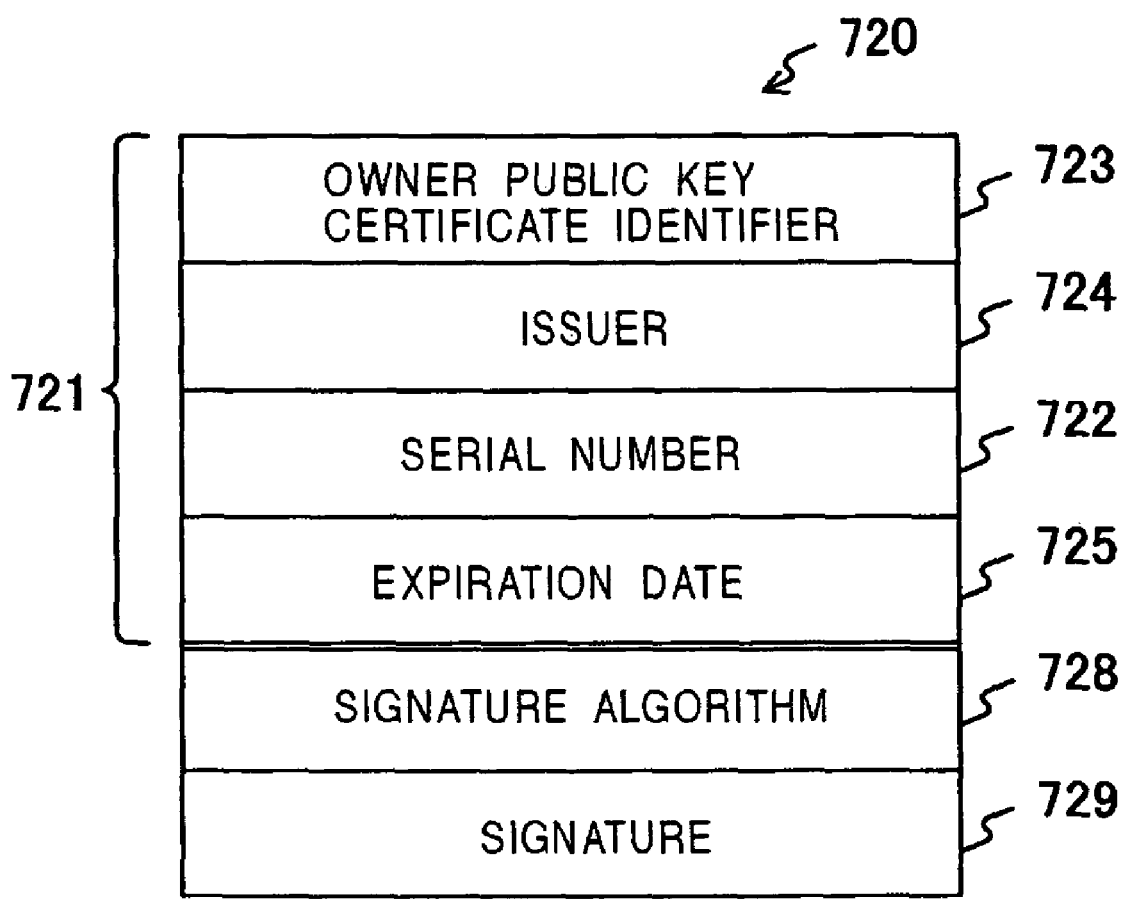
FIG. 4 is a diagram showing an attribute certificate 720 stored in an attribute-certificate table 620 according to the embodiment of the present invention.

FIG. 4 is a diagram showing an attribute certificate 720 stored in the attribute-certificate table 620. This attribute certificate is generally constituted by attribute certification information 721, a signature algorithm 728, and a signature 729. The attribute certification information 721 includes an owner public key certificate identifier 723, an issuer 724, a serial number 722, and an expiration date 725.

The owner public key certificate identifier 723 identifies a public key certificate of the owner of the attribute certificate. More specifically, the public key certificate is identified using the issuer 714 and the serial number 712 of the public key certificate 612 (see FIG. 3). The public key certificate identifier 723 may be an identifier having a function of identifying the owner, and may be represented by, for example, an MAC address of the owner or the like. The issuer 724 represents the name of an attribute certificate authority (AA) serving as an attribute certificate issuer, and may be represented by, for example, an MAC address of the issuer or the like. The serial number 722 represents a serial number of the attribute certificate, and is numbered by the attribute certificate authority serving as an attribute certificate issuer. The attribute certificate is uniquely identified by the serial number 722 and the issuer 724. The expiration date 725 represents an expiration date of the attribute certificate.

The signature 729 represents a signature added to the attribute certificate by the attribute certificate authority, and the signature algorithm 728 represents a signature algorithm used for the signature 729. The details of the signature algorithm are similar to those of the signature algorithm 718 of the public key certificate described above, and the message digest of the attribute certification information 721 is encrypted using an attribute-certificate-authority secret key to produce the signature 729.

The signature 729 of the attribute certificate is decoded using an attribute-certificate-authority public key to obtain a message digest. The user of the attribute certificate generates a message digest of the attribute certification information 721, and compares the generated message digest with the message digest decoded by the attribute-certificate-authority public key to verify that the content of the attribute certification information 721 is not tampered with.

FIG. 5 illustrates an example structure of the attribute-certificate revocation list table 630 according to the embodiment of the present invention. The attribute-certificate revocation list table 630 stores information about a revoked attribute certificate, and includes a set of an attribute certificate identifier 631 of the revoked attribute certificate and a revocation time 632. In order to forcibly revoke an attribute certificate of a lost or stolen terminal, an attribute certificate revocation list (ARL) is issued. The set of attribute certificate identifier 631 and revocation date 632 is extracted from a corresponding revocation list entry of the attribute certificate revocation list for storage. The attribute certificate identifiers 631 identify a revoked attribute certificate. More specifically, the revoked attribute certificate is identified by the issuer 724 and the serial number 722 of the attribute certificate 720 (see FIG. 4).

Figure 6:
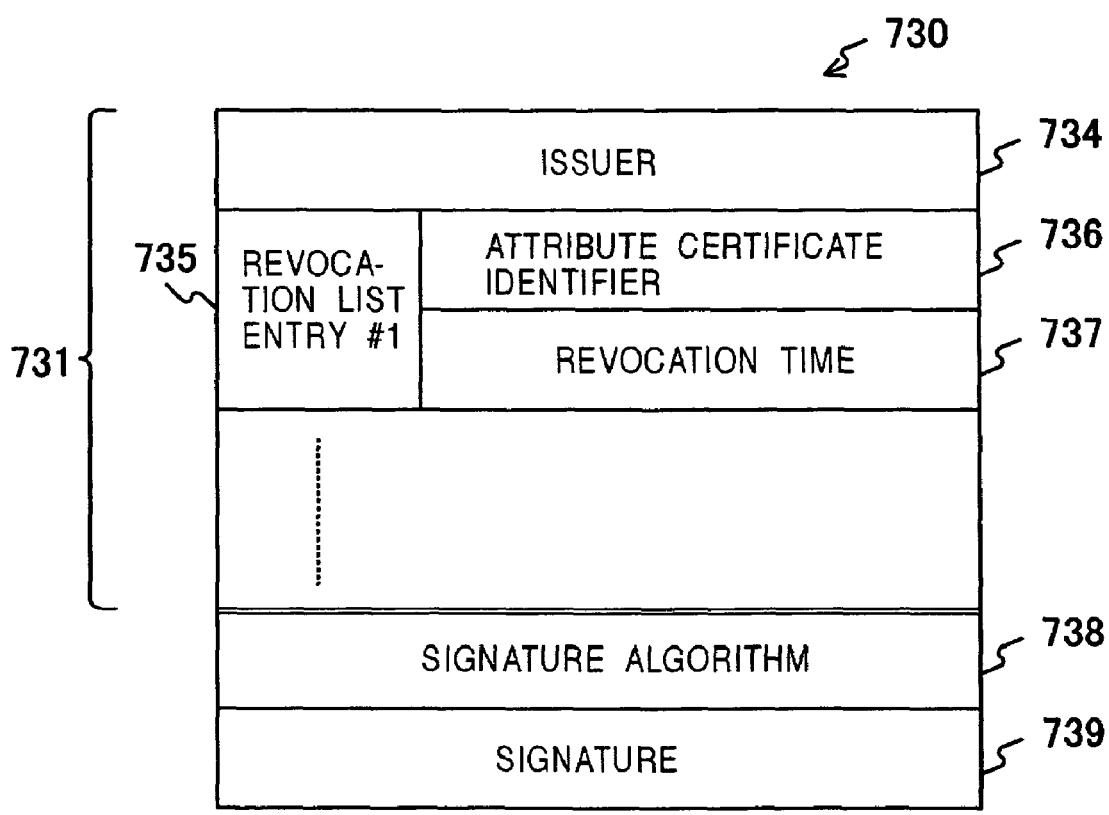
FIG. 6 is an illustration showing a format of an attribute certificate revocation list 730 according to the embodiment of the present invention.

FIG. 6 illustrates a format of an attribute certificate revocation list 730. This attribute certificate revocation list is generally constituted by a pre-signature revocation list 731, a signature algorithm 738, and a signature 739. The pre-signature revocation list 731 includes an issuer 734 of the pre-signature revocation list and more than one revocation list entry 735. The revocation list entry 735 includes a set of an attribute certificate identifier 736 of a revoked attribute certificate and a revocation time 737. The set of attribute certificate identifier 736 and revocation time 737 in the revocation list entry 735 corresponds to the set of attribute certificate identifier 631 and revocation time 632 in the attribute certificate revocation list table 630 (see FIG. 5).

The signature 739 represents a signature added to the attribute certificate revocation list by an issuer, and the signature algorithm 738 represents a signature algorithm used for the signature 739. The details of the signature algorithm are similar to those of the signature algorithm 718 of the public key certificate described above. The message digest of the pre-signature revocation list 731 is encrypted using an issuer secret key to produce the signature 739.

The signature 739 of the attribute certificate revocation list is decoded using an issuer public key to obtain a message digest. The user of the attribute certificate revocation list generates a message digest of the pre-signature revocation list 731, and compares the generated message digest with the message digest decoded by the issuer public key to verify that the content of the pre-signature revocation list 731 is not tampered with.

In the wireless ad-hoc communication system, it is difficult to presume the existence of a fixed server that collectively manages the attribute certificate revocation list. It is therefore presumed that all terminals setting up a network are capable of issuing an attribute certificate revocation list. A terminal that issues an attribute certificate revocation list broadcasts the attribute certificate revocation list to other terminals, and other terminals can verify the validity of the attribute certificate. When a terminal connects to the network again, this terminal and another terminal exchange their attribute certificate revocation lists to merge them into the attribute-certificate revocation list table 630. Therefore, the latest attribute-certificate revocation list table 630 can be maintained. In order to easily authenticate an issuer, the public key certificate and the attribute certificate are preferably appended when the attribute certificate revocation list is issued.

Figure 15:
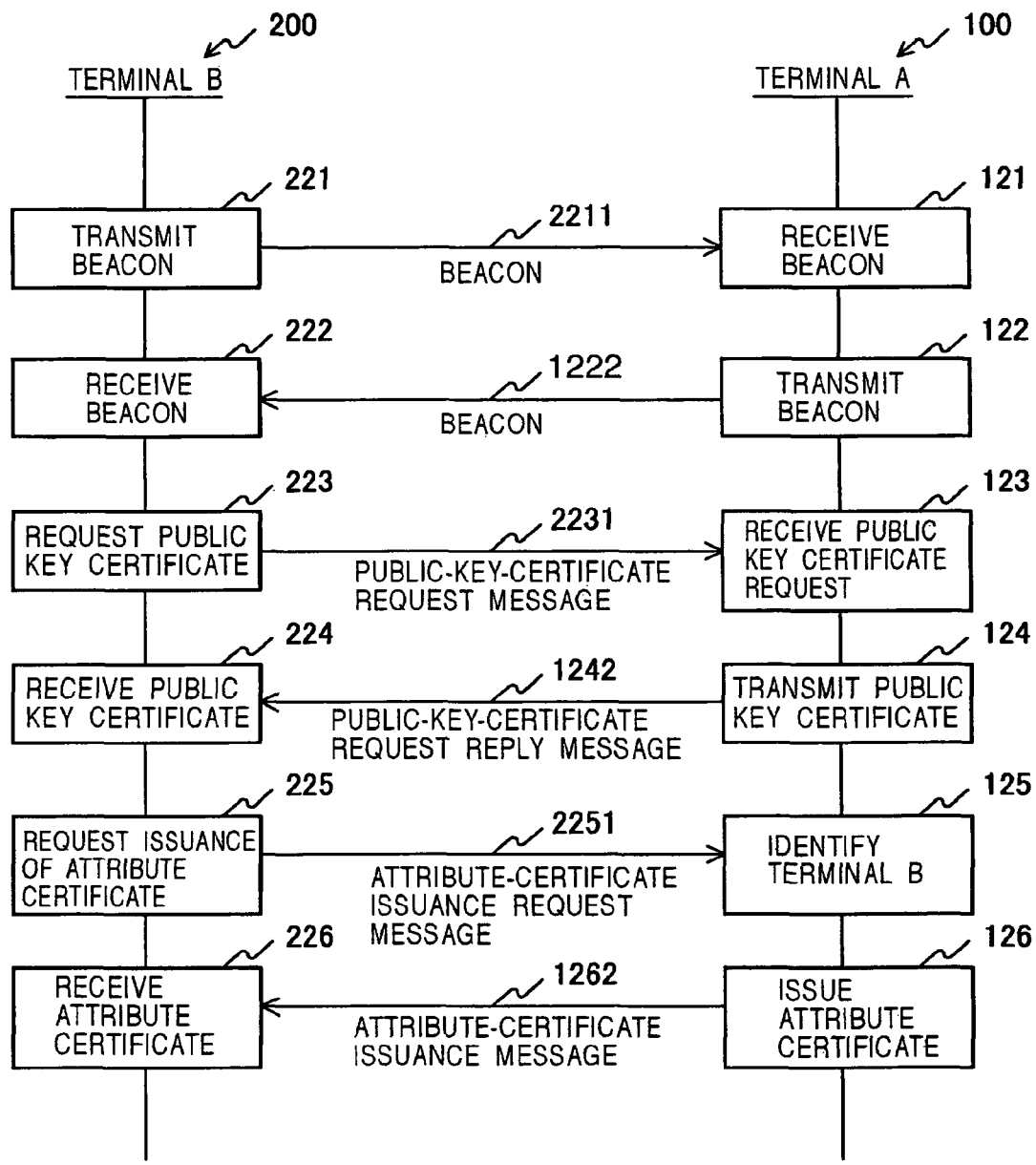
FIG. 15 is a chart showing an initial registration procedure according to a second example of the embodiment of the present invention.
Figure 18:
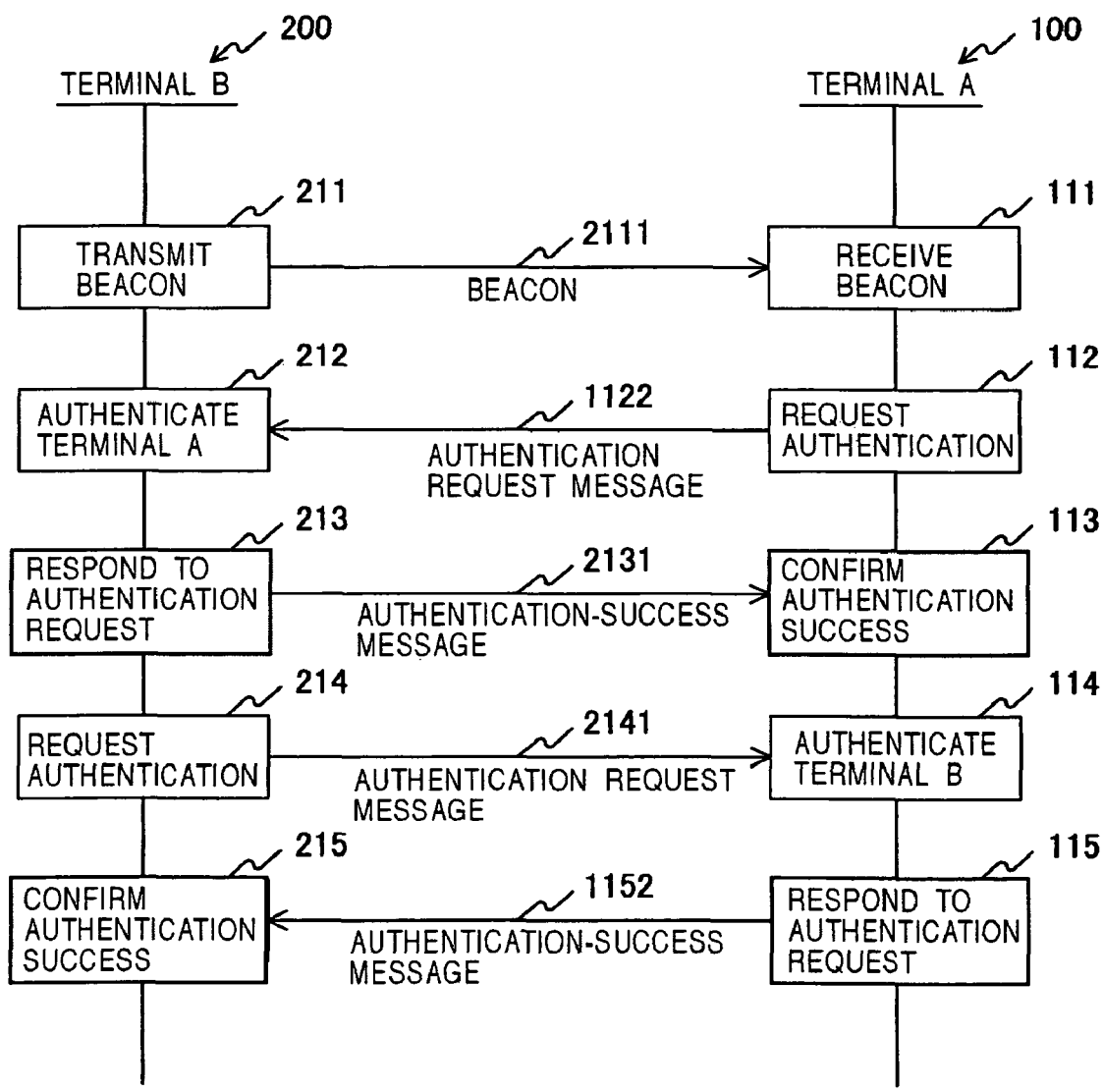
FIG. 18 is a chart showing a mutual authentication procedure according to the embodiment of the present invention.

The operation of the wireless ad-hoc communication system according to the embodiment of the present invention will now be described with reference to the drawings. In the embodiment of the present invention, a terminal connects to network resources by performing an "initial registration" procedure (see FIG. 7 or 15) in which the terminal receives an issued attribute certificate and a "mutual authentication" procedure (see FIG. 18) in which the terminal performs authentication using the attribute certificate. The processes shown in FIGS. 7, 15, and 18 are implemented by the control unit 330 of the wireless terminal 300.

Figure 7:
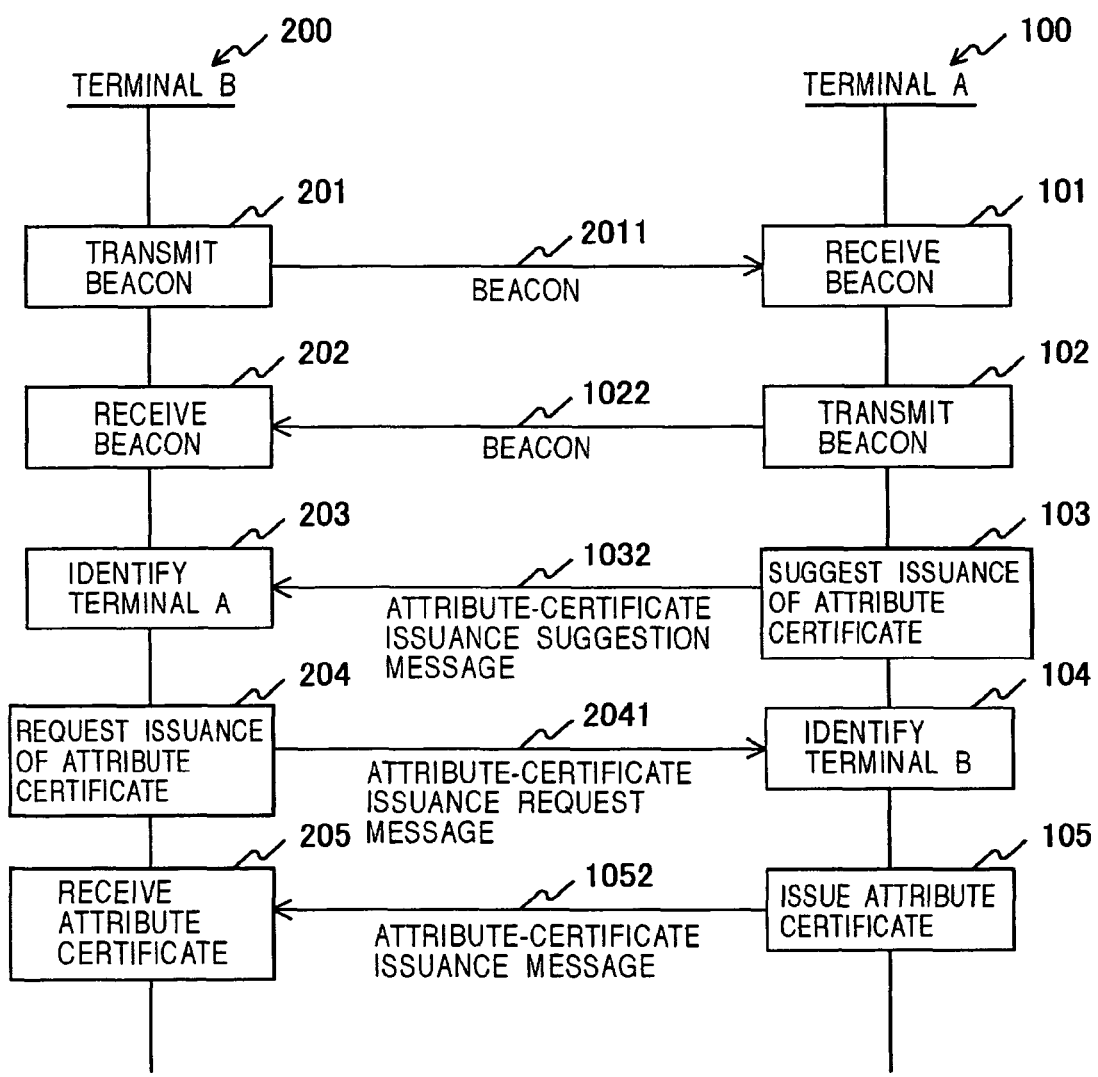
FIG. 7 is a chart showing an initial registration procedure according to a first example of the embodiment of the present invention.

FIG. 7 is a chart showing a first example of the initial registration procedure according to the embodiment of the present invention. In FIG. 7, a terminal A (100) is an attribute-certificate issuing terminal that has participated in a network, and a terminal B (200) is a new terminal that is to participate in the network.

In the wireless ad-hoc communication system, each terminal constantly transmits a beacon to notify other terminals of the presence of this terminal. In the embodiment of the present invention, a beacon includes not only a signal including only beacon information serving as a flag signal, but also a signal in which certain data information is added to the beacon information. In the example shown in FIG. 7, a beacon 2011 transmitted (201) by the terminal B is received (101) by the terminal A, and the beacon 1022 transmitted (102) by the terminal A is received (202) by the terminal B. One of the terminals A and B determines the terminal identifier of the other party, and vice versa, based on the frame structure of the beacon described below.

Figure 8:
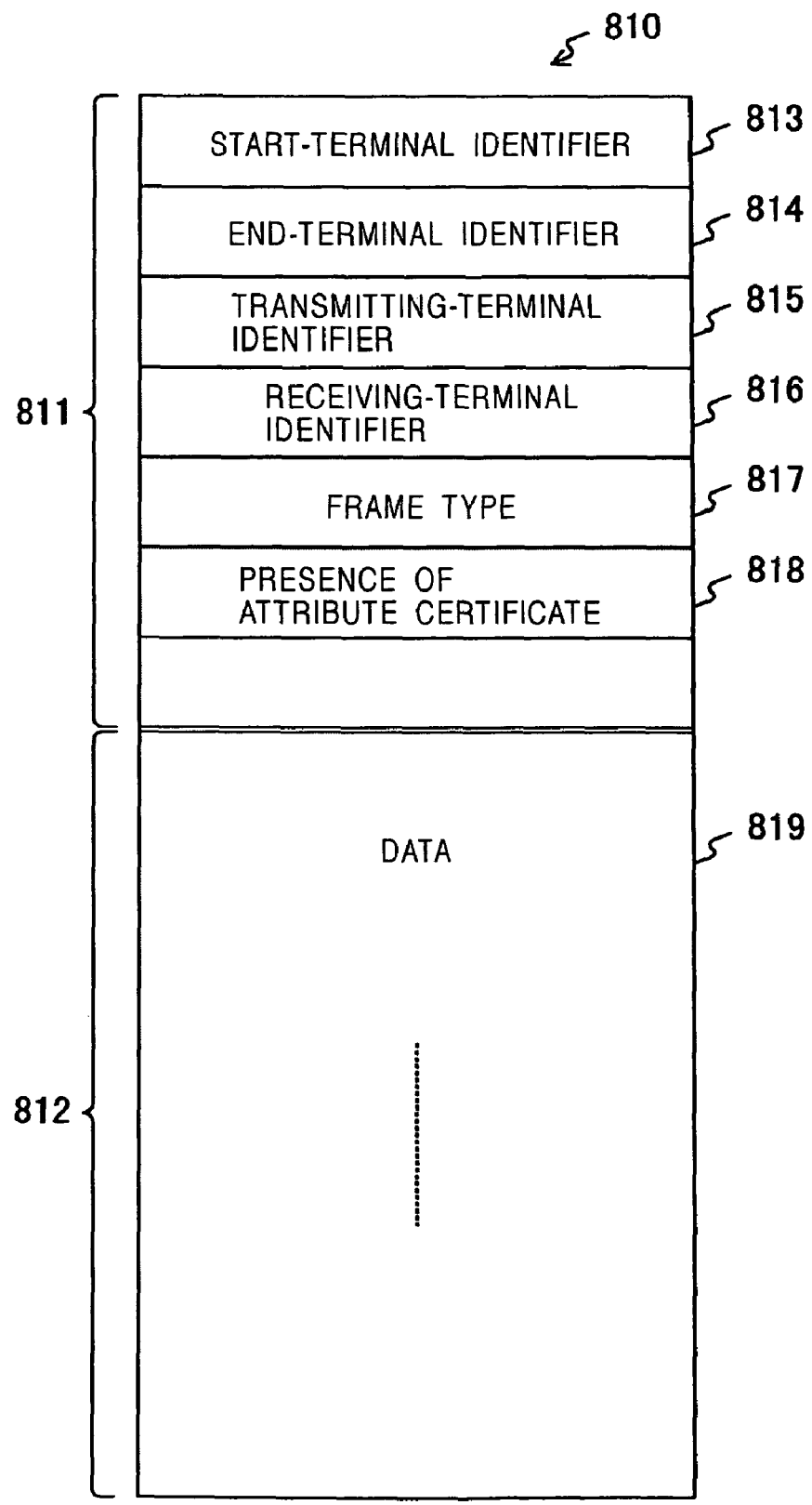
FIG. 8 is an illustration showing the structure of a beacon frame 810 according to the embodiment of the present invention.

FIG. 8 shows the frame structure of the beacons 2011 and 1022. A beacon frame 810 is constituted by a header portion 811 and a payload portion 812. The header portion 811 includes a start-terminal identifier 813, an end-terminal identifier 814, a transmitting-terminal identifier 815, a receiving-terminal identifier 816, a frame type 817, and the presence of attribute certificate 818. The start-terminal identifier 813 represents a terminal identifier of a terminal that originates this frame. As described above, the terminal identifier may be an identifier that uniquely identifies a terminal in a network, and may be represented by, for example, a MAC address in the Ethernet®. The end-terminal identifier 814 represents a terminal identifier of a final destination terminal of this frame. In the beacon frame 810, the end-terminal identifier 814 has a broadcast address (for example, all bits are set to 1).

The transmitting-terminal identifier 815 and the receiving-terminal identifier 816 are used for relaying the frame. In the wireless ad-hoc communication system, all terminals in a network cannot directly communicate with one another, and a multi-hop communication path must be set up to transmit a frame to a terminal that is out of radio coverage via another terminal. In this case, the frame is transmitted and received between the terminals using the transmitting-terminal identifier 815 and the receiving-terminal identifier 816.

The frame type 817 represents the type of frame. In this example, the frame type 817 indicates a beacon frame. The presence of attribute certificate 818 indicates whether or not a transmitting terminal of the beacon frame has an attribute certificate indicating access rights to the network resources. In the initial registration sequence shown in FIG. 7, the terminal B does not have an attribute certificate, and "no attribute certificate" is indicated in the presence of attribute certificate 818. In this example beacon frame, data 819 in the payload portion 812 does not include other information.

Upon receiving (101) the beacon 2011 transmitted from the terminal B, the terminal A checks the start-terminal identifier 814 and the presence of attribute certificate 818 of the beacon frame 810. If it is determined that the terminal B corresponding to the start terminal does not have an attribute certificate, the terminal A transmits (103) an attribute-certificate issuance suggestion message 1032 for suggesting an attribute-certificate issuing request to the terminal B. In this example, it is presumed that the attribute-certificate issuance suggestion message is automatically transmitted, and the presence of the attribute certificate indicated in the beacon is checked. However, the terminal A may generate an attribute certificate issuance suggestion message without checking the presence of the attribute certificate, and may transmit the attribute certificate issuance suggestion message to the terminal B at any time.

Figure 9:
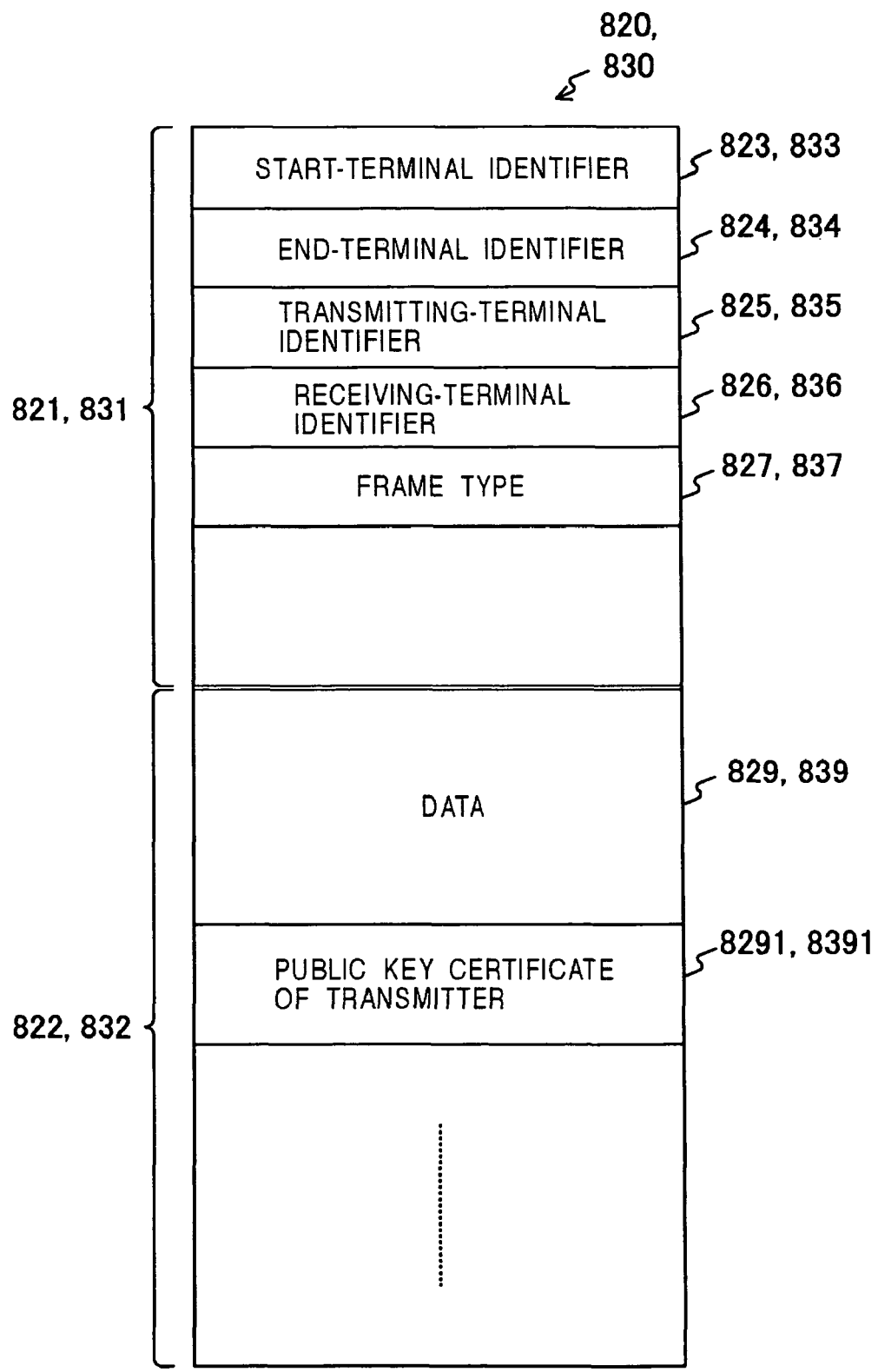
FIG. 9 is an illustration showing the structure of an attribute-certificate issuance suggestion frame 820 and an attribute-certificate issuance request frame 830 according to the embodiment of the present invention.

FIG. 9 illustrates the frame structure of the attribute-certificate issuance suggestion message 1032. An attribute-certificate issuance suggestion frame 820 is constituted by a header portion 821 and a payload portion 822. The header portion 821 includes a start-terminal identifier 823, an end-terminal identifier 824, a transmitting-terminal identifier 825, a receiving-terminal identifier 826, and a frame type 827. The details of the header portion 821 are similar to those of the beacon frame 810 described with reference to FIG. 8. In the attribute-certificate issuance suggestion frame 820, data 829 in the payload portion 822 includes a public key certificate 8291 of the transmitting terminal A. The public key certificate 8291 of the terminal A is stored in advance in the generated-key table 650 of the terminal A. The data 829 may further include a terminal identifier, etc., other than the public key certificate 8291.

Upon receiving the attribute-certificate issuance suggestion message 1032 transmitted from the terminal A, the terminal B identifies (203) the terminal A from the content. For example, the start-terminal identifier 823 of the attribute-certificate issuance suggestion frame 820 (see FIG. 9) or the public key owner 716 (see FIG. 3) in the public key certificate 8291 is displayed on the display unit 340 (see FIG. 1) to prompt the user to determine whether the terminal A is a correct attribute-certificate issuing terminal or not. This prevents intervention of a malicious terminal or an unintended terminal by address forging, etc. When the transmitting terminal A is a reliable terminal and the terminal A is intended to issue an attribute certificate, the user performs confirmation using the operating unit 350 (see FIG. 1).

If the suggestion is accepted by the confirmation (203) of the user, the terminal B transmits (204) an attribute-certificate issuance request message 2041 for making a request to issue an attribute certificate to the terminal A. The frame structure of the attribute-certificate issuance request message 2041 is similar to the frame 820 of the attribute-certificate issuance suggestion message 1032 shown in FIG. 9. Also, data 839 of a payload portion 832 includes a public key certificate 8391 of the transmitting terminal B.

Figure 10:
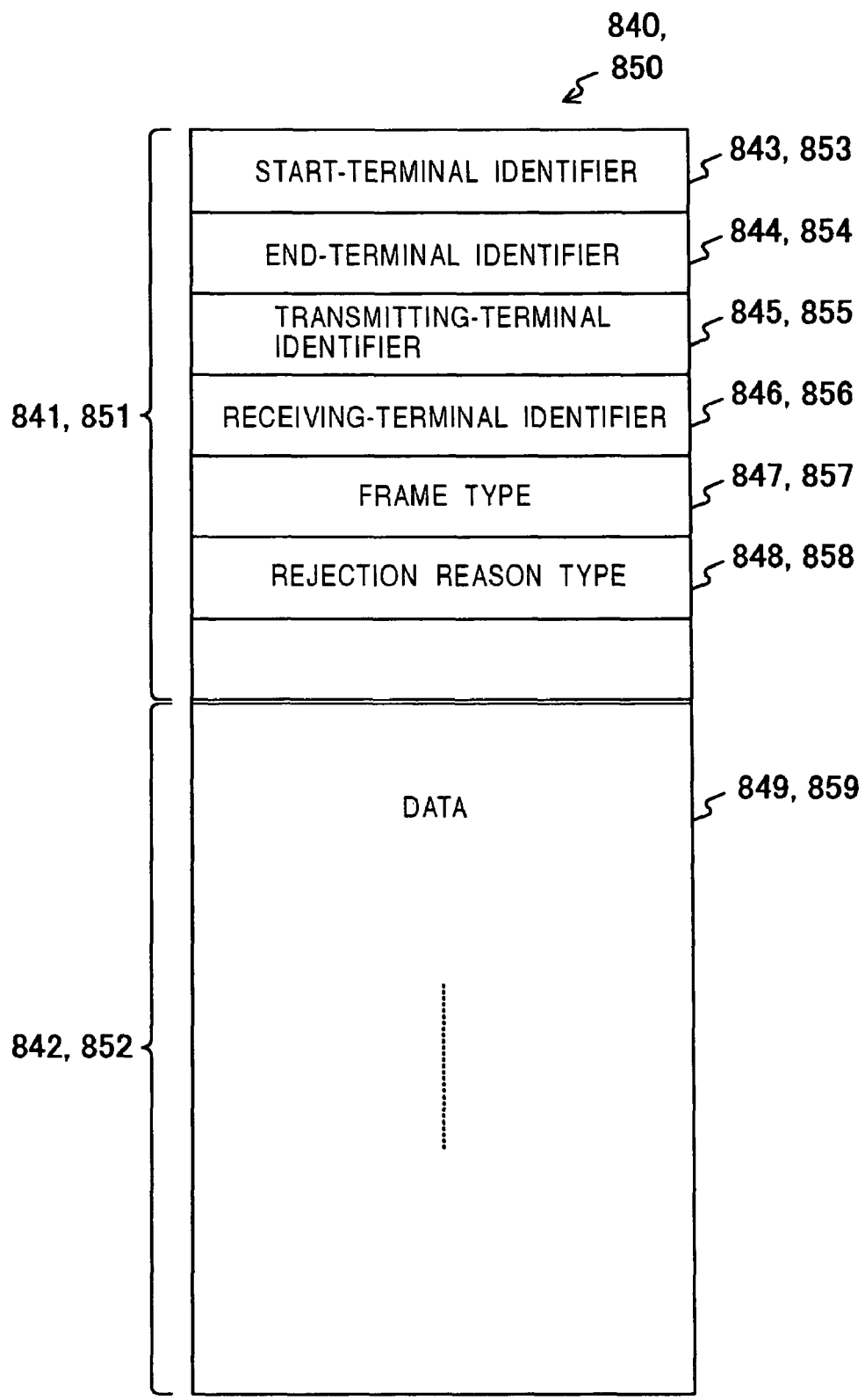
FIG. 10 is an illustration showing the structure of an attribute-certificate issuance suggestion rejection frame 840 and an attribute-certificate issuance request rejection frame 850 according to the embodiment of the present invention.

If the suggestion is rejected by the confirmation (203) of the user, the terminal B may transmit an attribute-certificate issuance suggestion rejection message for notifying a rejection of the attribute-certificate issuance suggestion to the terminal A. FIG. 10 shows the frame structure of the attribute-certificate issuance suggestion rejection message. An attribute-certificate issuance suggestion rejection frame 840 is constituted by a header portion 841 and a payload portion 842. The header portion 841 includes a start-terminal identifier 843, an end-terminal identifier 844, a transmitting-terminal identifier 845, a receiving-terminal identifier 846, a frame type 847, and a rejection reason type 848. The details of the header portion 841 are similar to those of the beacon frame 810 described with reference to FIG. 8, except for the rejection reason type 848 that is specific to the attribute-certificate issuance suggestion rejection frame 840. The rejection reason type 848 indicates coded reasons, e.g., a revocation conducted by the user, the attribute certificate authority being unreliable, etc.

Upon receiving the attribute-certificate issuance request message 2041 transmitted from the terminal B, the terminal A identifies (104) the terminal B from the content. For example, the start-terminal identifier 833 of the attribute-certificate issuance request frame 830 (see FIG. 9) or the public key owner 716 (see FIG. 3) in the public key certificate 8391 is displayed on the display unit 340 (see FIG. 1) to prompt the user to determine whether the terminal B is a reliable terminal or not. If the terminal B is a reliable terminal, the user performs confirmation using the operating unit 350 (see FIG. 1).

Figure 11:
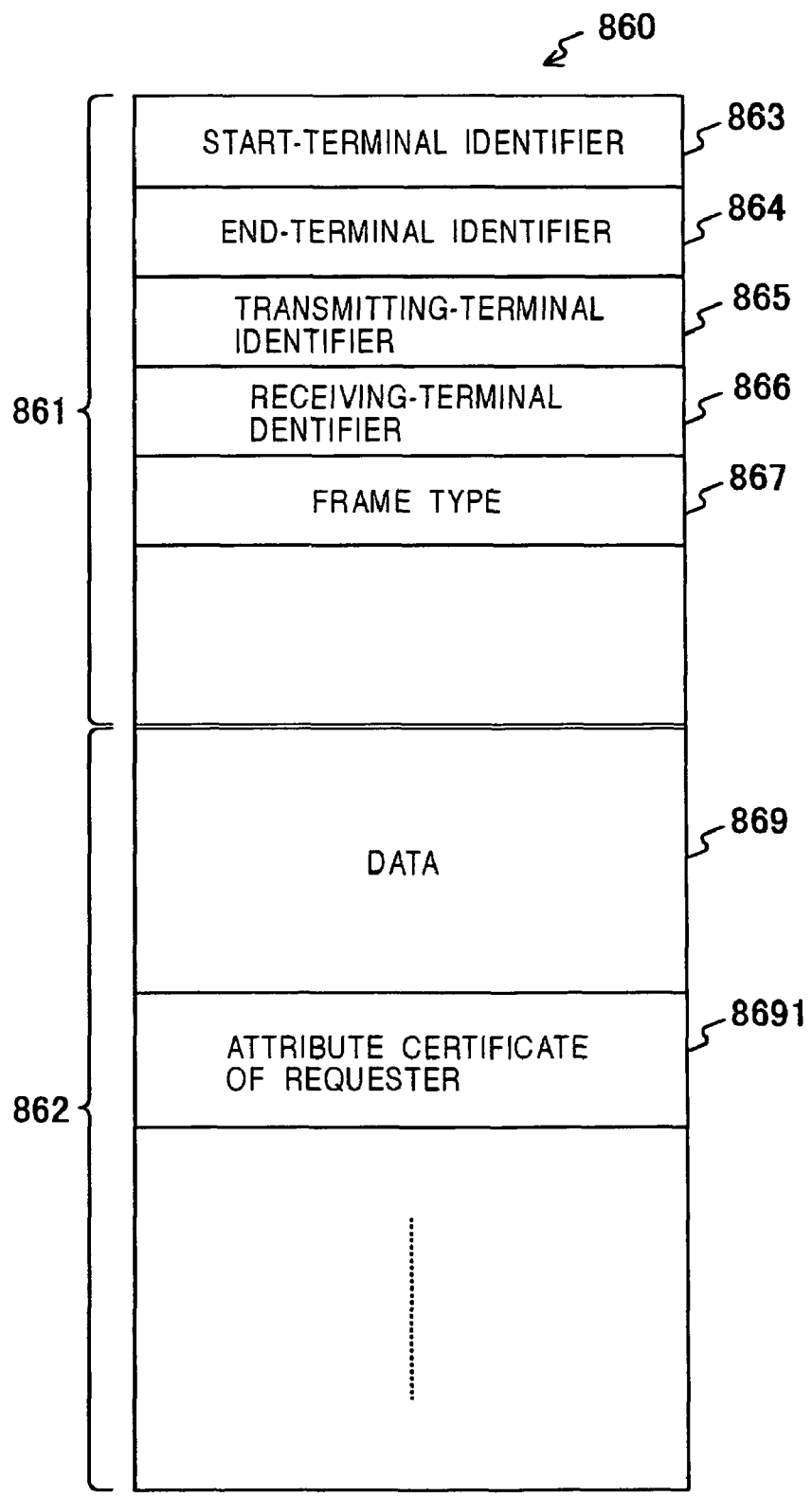
FIG. 11 is an illustration showing the structure of an attribute-certificate issuance frame 860 according to the embodiment of the present invention.

After the confirmation has been performed by the user, the terminal A transmits (105) an attribute-certificate issuance message 1052 for issuing an attribute certificate to the terminal B. FIG. 11 shows the frame structure of the attribute-certificate issuance message 1052. An attribute-certificate issuance frame 860 is constituted by a header portion 861 and a payload portion 862. The header portion 861 includes a start-terminal identifier 863, an end-terminal identifier 864, a transmitting-terminal identifier 865, a receiving-terminal identifier 866, and a frame type 867. The details of the header portion 861 are similar to those of the attribute-certificate issuance suggestion frame 820 described with reference to FIG. 9. In the attribute-certificate issuance frame 860, data 869 of the payload portion 862 includes an attribute certificate 8691 that certifies the requesting terminal B as the owner and that is signed by the terminal A. Upon receiving (205) the attribute-certificate issuance message 1052 from the terminal A, the terminal B extracts the attribute certificate 8691 from the attribute-certificate issuance frame 860, and stores it in the attribute certificate table 620.

If the confirmation (104) is rejected by the user, the terminal A may transmit an attribute-certificate issuance request rejection message for notifying a rejection of the attribute-certificate issuance request to the terminal B. The frame structure of the attribute-certificate issuance request rejection message is similar to the attribute-certificate issuance suggestion rejection frame 840 shown in FIG. 10.

Figure 12:
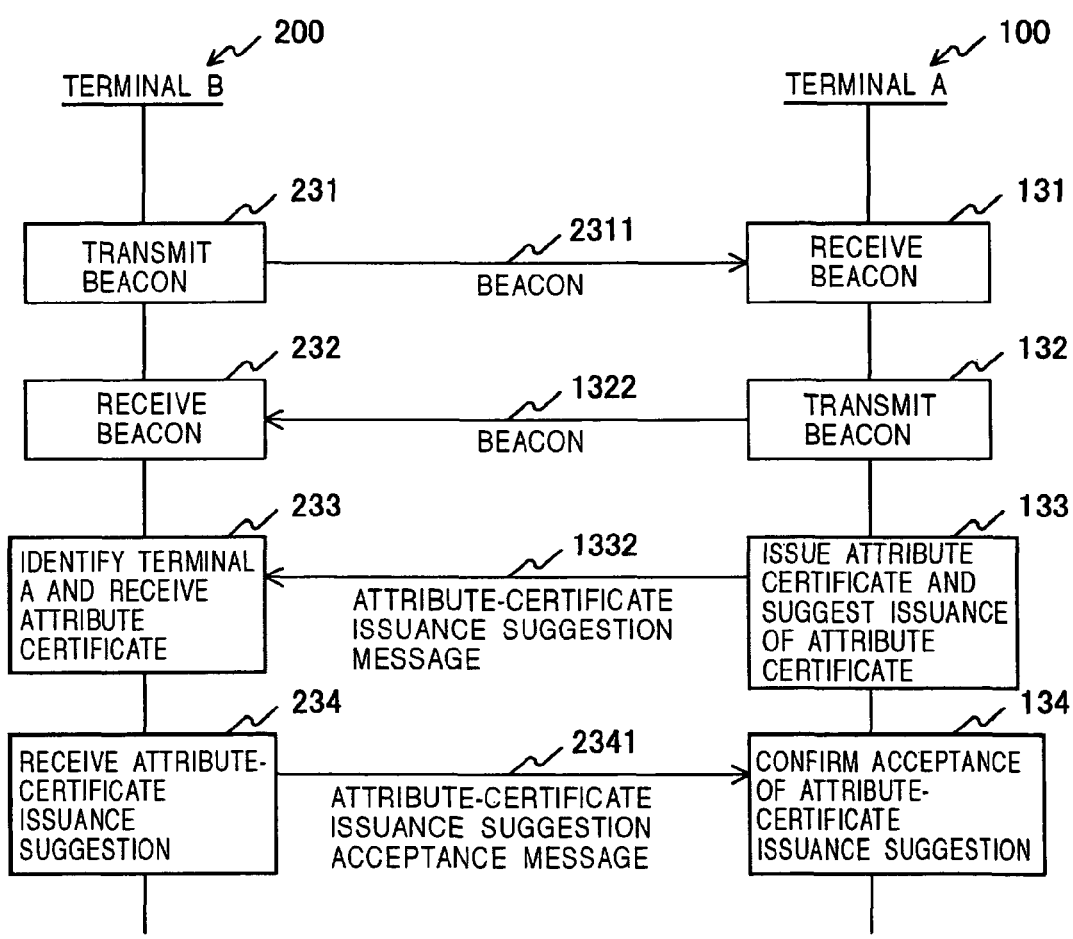
FIG. 12 is a chart showing an initial registration procedure according to a modification of the first example of the embodiment of the present invention.

FIG. 12 is a chart showing a modification of the first example of the initial registration procedure according to the embodiment of the present invention. In this modification, an attribute certificate is issued when an attribute-certificate issuance suggestion message is transmitted from an attribute-certificate issuing terminal, and is appended to this message, to thereby reduce the number of messages exchanged between the terminals. In FIG. 12, like the first example shown in FIG. 7, a terminal A (100) is an attribute-certificate issuing terminal and a terminal B (200) is a new participating terminal. Likewise, both terminals transmit beacons. A beacon 2311 transmitted (231) by the terminal B is received (131) by the terminal A, and a beacon 1322 transmitted (132) by the terminal A is received (232) by the terminal B. Thus, one of the terminals A and B determines the terminal identifier of the other party, and vice versa. The frame structure of these beacons is similar to that in the first example described with reference to FIG. 8.

Figure 13:
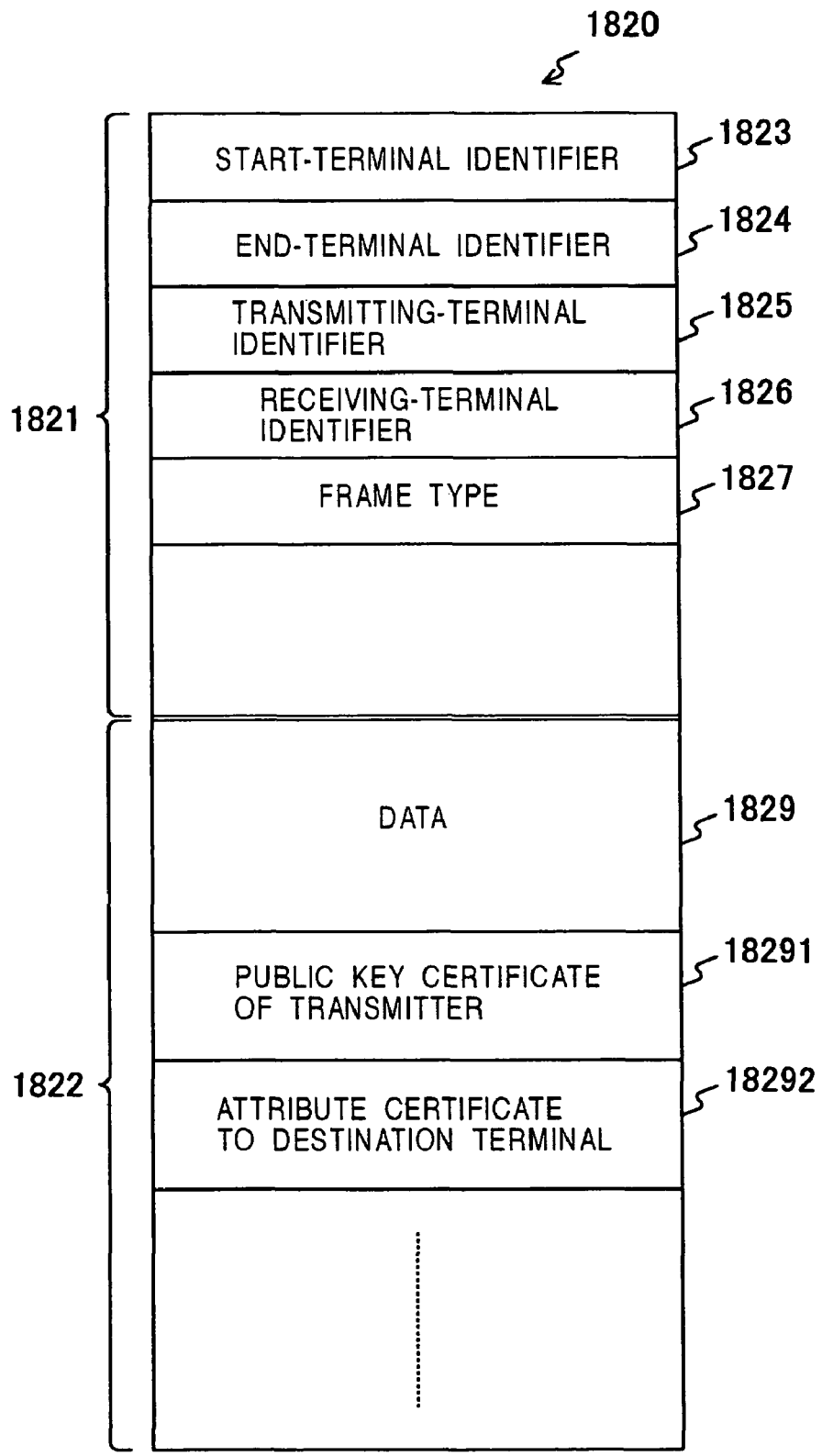
FIG. 13 is an illustration showing the structure of an attribute-certificate issuance suggestion frame 1820 according to the embodiment of the present invention.

In the example shown in FIG. 12, unlike the first example shown in FIG. 7, upon receiving the beacon, the terminal A (100) serving as an attribute-certificate issuing terminal issues an attribute certificate to the terminal B (200) serving as a new participating terminal without receiving an attribute-certificate issuance request message (2041 in FIG. 7), and transmits the attribute certificate that is contained in the data in the payload portion of an attribute-certificate issuance suggestion message 1332. The attribute certificate certifies the issuance destination terminal B as the owner, and is signed by the terminal A. The structure of a frame 1820 of the attribute-certificate issuance suggestion message 1332 is shown in FIG. 13. This structure is similar to that of the frame 820 of the attribute-certificate issuance suggestion message shown in FIG. 9, except that data 1829 in a payload portion 1822 includes an attribute certificate 18292 to a destination terminal. Therefore, the number of messages can be reduced compared to the first example shown in FIG. 7. Whether or not the attribute-certificate issuance suggestion message includes the attribute certificate 18292 may be determined by the terminal B (200) from the frame type 827 or 1827 or from the content of an additionally provided field.

In the example shown in FIG. 12, upon receiving (233) the attribute-certificate issuance suggestion message 1332 transmitted (133) from the terminal A (100), the terminal B (200) identifies the terminal A (100) from the content. For example, a start-terminal identifier 1823 of the attribute-certificate issuing suggestion frame 1820 is displayed to prompt the user to determine whether the terminal A is a correct attribute-certificate issuing terminal or not. This prevents intervention of a malicious terminal or an unintended terminal by address forging, etc. If the transmitting terminal A (100) is a reliable terminal and the attribute certificate issued by the terminal A (100) is accepted, the user performs confirmation using the operating unit 350 (see FIG. 1). Upon accepting the attribute-certificate issuance suggestion message 1332 from the terminal A (100), the terminal B (200) extracts the attribute certificate 18292 from the payload portion 1822 of the attribute-certificate issuance suggestion frame 1820, and stores it in the attribute certificate table 620 (see FIG. 1).

Figure 14:
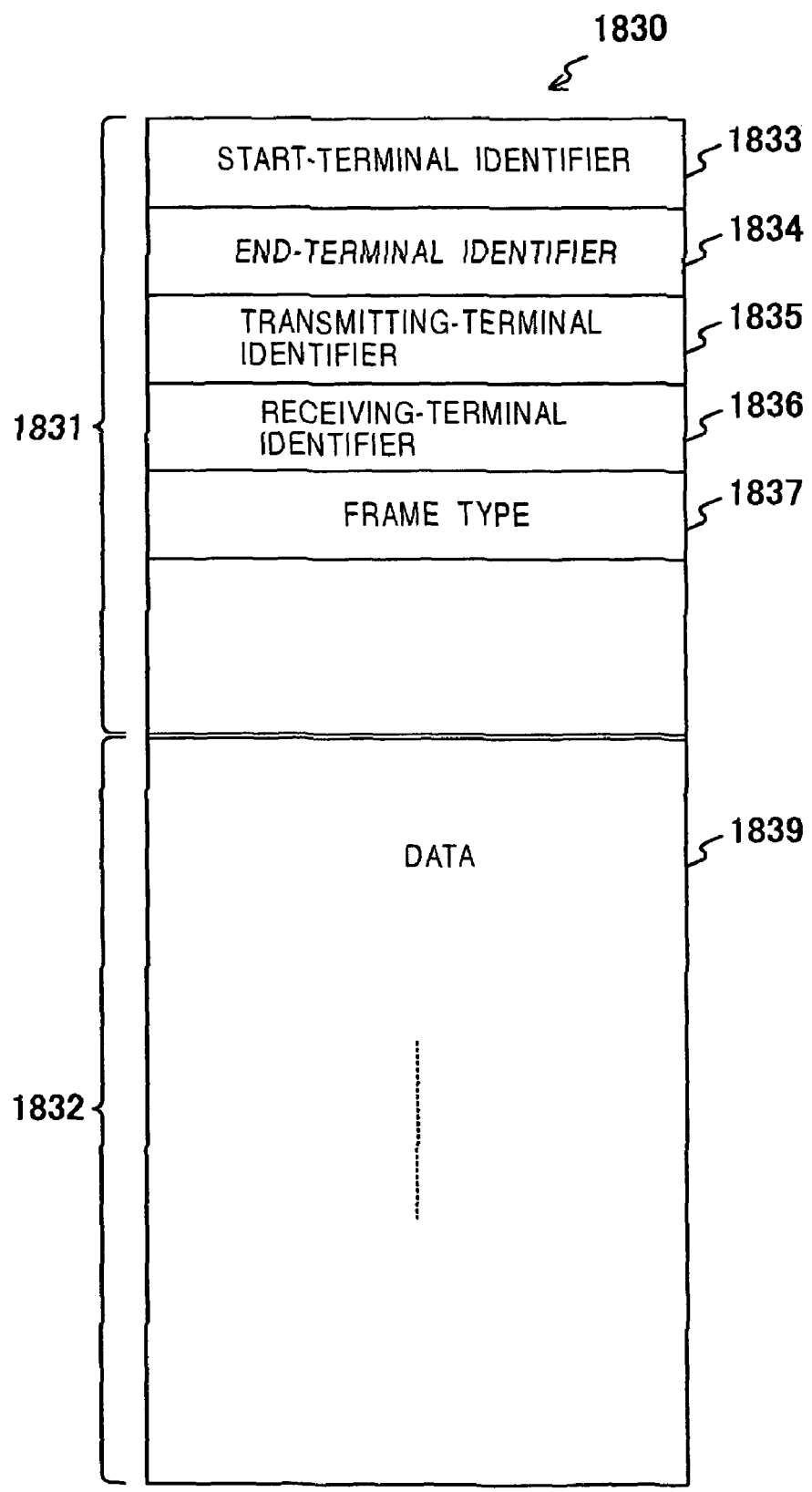
FIG. 14 is an illustration showing the structure of an attribute-certificate issuance suggestion acceptance frame 1830 according to the embodiment of the present invention.

After the confirmation (233) has been performed by the user, the terminal B (200) transmits (234) an attribute-certificate issuance suggestion acceptance message 2341 for accepting the attribute-certificate issuance suggestion message 1332 to the terminal A (100). The structure of a frame 1830 of the attribute-certificate issuance suggestion acceptance message 2341 is shown in FIG. 14, and is basically similar to the frame structure of the attribute-certificate issuance request message shown in FIG. 9.

If the suggestion is rejected by the confirmation (233) of the user, the terminal B (200) may transmit an attribute-certificate issuance suggestion rejection message for notifying a rejection of the attribute-certificate issuance suggestion to the terminal A. The structure of the frame 840 of the attribute-certificate issuance suggestion rejection message is similar to that described with reference to FIG. 10.

FIG. 15 is a chart showing a second example of the initial registration procedure according to the embodiment of the present invention. Like the first example shown in FIG. 7, a terminal A (100) is an attribute-certificate issuing terminal, and a terminal B (200) is a new participating terminal. Likewise, both terminals transmit beacons. A beacon 2211 transmitted (221) by the terminal B is received (121) by the terminal A, and a beacon 1222 transmitted (122) by the terminal A is received (222) by the terminal B. Thus, one of the terminals A and B determines the terminal identifier of the other party, and vice versa. The frame structure of the beacons 2211 and 1222 is similar to that shown in FIG. 8.

Figure 16:
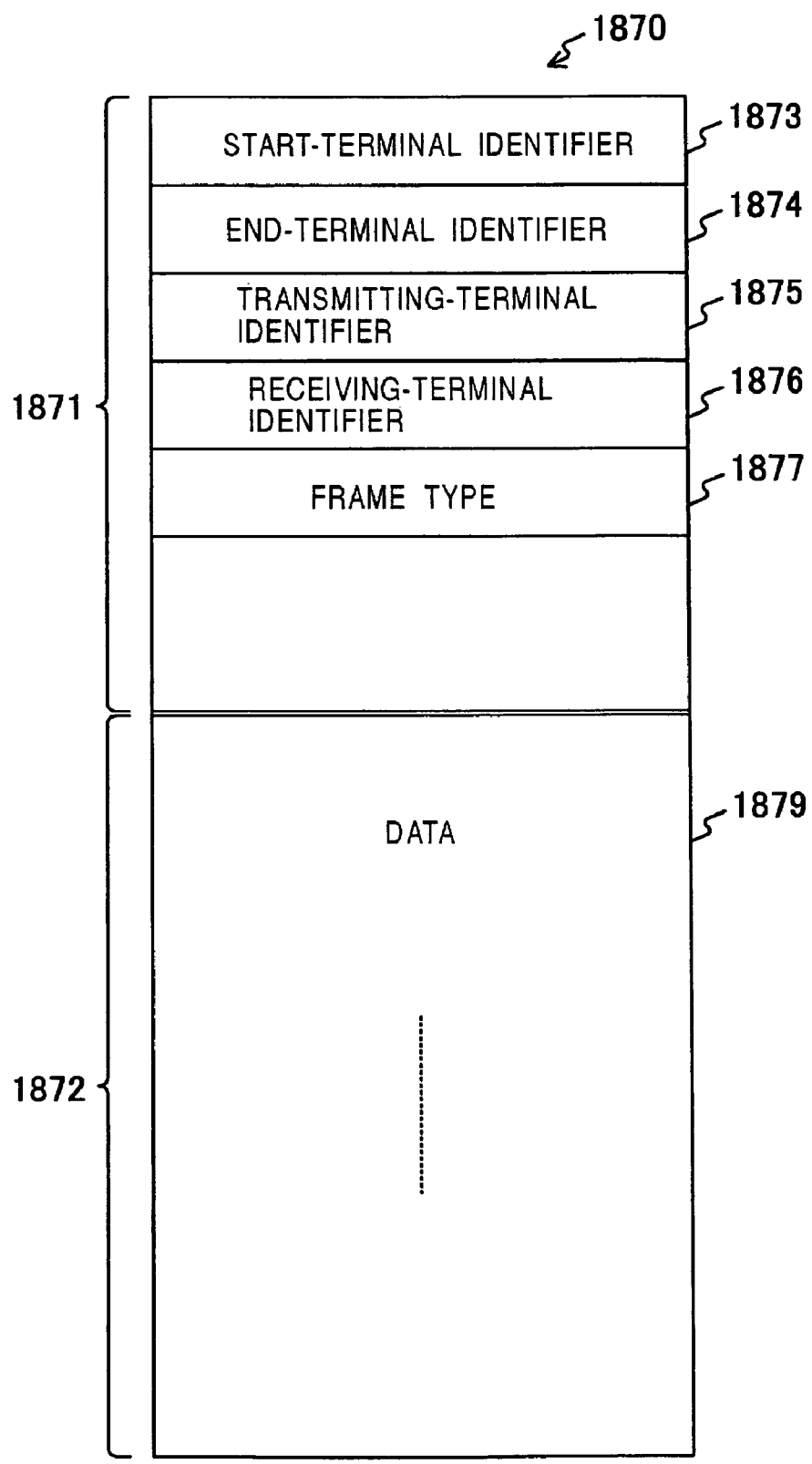
FIG. 16 is an illustration showing the structure of a public-key-certificate request frame 1870 according to the embodiment of the present invention.

In the second example shown in FIG. 15, unlike the first example shown in FIG. 7, upon receiving the beacon, the terminal B serving as a new participating terminal transmits (225) an attribute-certificate issuance request message 2251 to the terminal A serving as an attribute-certificate issuing terminal without receiving an attribute-certificate issuance suggestion message. The structure of the frame 830 of the attribute-certificate issuance request message 2251 is described above with reference to FIG. 9. If the terminal B does not have a public key certificate of the terminal A to which the attribute-certificate issuance request message 2251 is transmitted, the terminal B transmits a public-key-certificate request message 2231 to the terminal A to request (223) a public key certificate. A frame structure 1870 of the public-key-certificate request message 2231 is shown in FIG. 16, and is similar to the frame 820 (see FIG. 9) of the attribute-certificate issuance suggestion message 1032 described in the first example shown in FIG. 7. However, a payload portion 1872 does not include a public key certificate.

Figure 17:
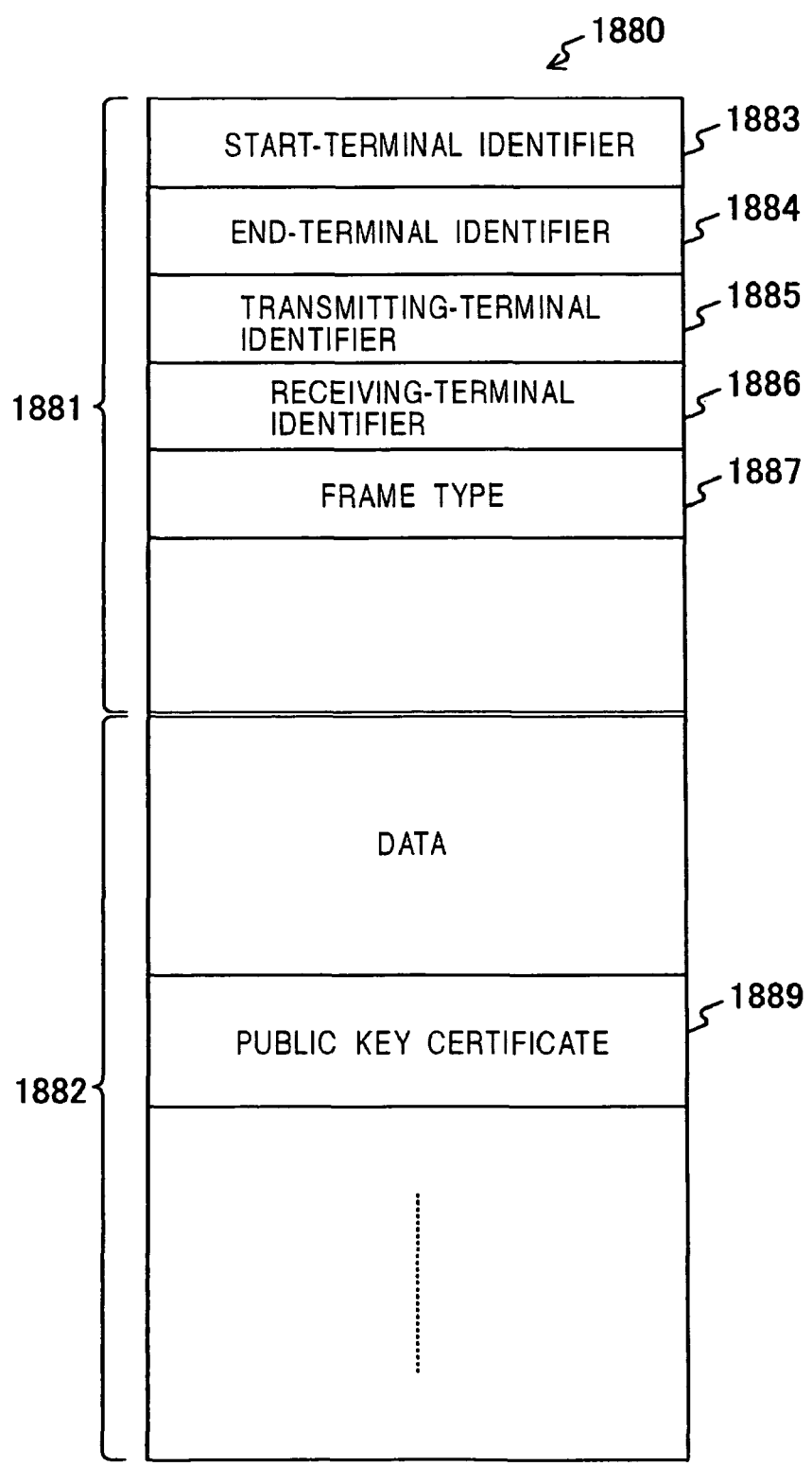
FIG. 17 is an illustration showing the structure of a public-key-certificate request reply frame 1880 according to the embodiment of the present invention.

Upon receiving (123) the public-key certificate request message 2231, the terminal A transmits (124) the public key certificate of the terminal A stored in the generated-key table 650 (see FIG. 1) in form of a public-key-certificate request reply message 1242. Then, the terminal B receives (224) the public key certificate of the terminal A serving as an attribute-certificate issuing terminal. A frame structure 1880 of the public-key-certificate request reply message 1242 is shown in FIG. 17, and is similar to the frame 820 (see FIG. 9) of the attribute-certificate issuance suggestion message 1032 described in the first example shown in FIG. 7. Also, data in a payload portion 1882 includes a public key certificate 1889 of the terminal A corresponding to the transmitting terminal.

Upon receiving the attribute-certificate issuance request message 2251 transmitted from the terminal B, the terminal A identifies (125) the terminal B from the content. For example, the start-terminal identifier 833 of the attribute-certificate issuance request frame 830 (see FIG. 9) or the public key owner 716 (see FIG. 3) in the public key certificate 8391 is displayed on the display unit 340 (see FIG. 1) to prompt the user to determine whether the terminal B is a reliable terminal or not. If the transmitting terminal B is a reliable terminal, the user performs confirmation using the operating unit 350 (see FIG. 1).

After the confirmation has been performed by the user, the terminal A transmits (126) an attribute-certificate issuance message 1262 for issuing an attribute certificate to the terminal B. Then, the terminal B receives (226) the attribute certificate. The structure of the frame 860 of the attribute-certificate issuance message 1262 is described above with reference to FIG. 11.

FIG. 18 is a chart showing the mutual authentication procedure according to the embodiment of the present invention. After the initial registration, the terminals mutually verify their attribute certificates to perform mutual authentication. In the wireless ad-hoc communication system according to the embodiment of the present invention, each terminal constantly transmits a beacon to notify other terminals of the presence of this terminal. In the following description, it is presumed that the beacon of a terminal B acts as a trigger for a terminal A to request authentication. However, as long as mutual authentication is finally performed, the beacon of either terminal may act as a trigger.

First, the terminal B transmits (211) a beacon 2111 for participating in a network. The frame structure of the beacon 2111 is described above with reference to FIG. 8. Unlike the initial registration sequence shown in FIG. 7, in the mutual authentication sequence shown in FIG. 18, the terminal B has an attribute certificate, and "the presence of attribute certificate" is indicated in the presence of attribute certificate 818.

Figure 19:
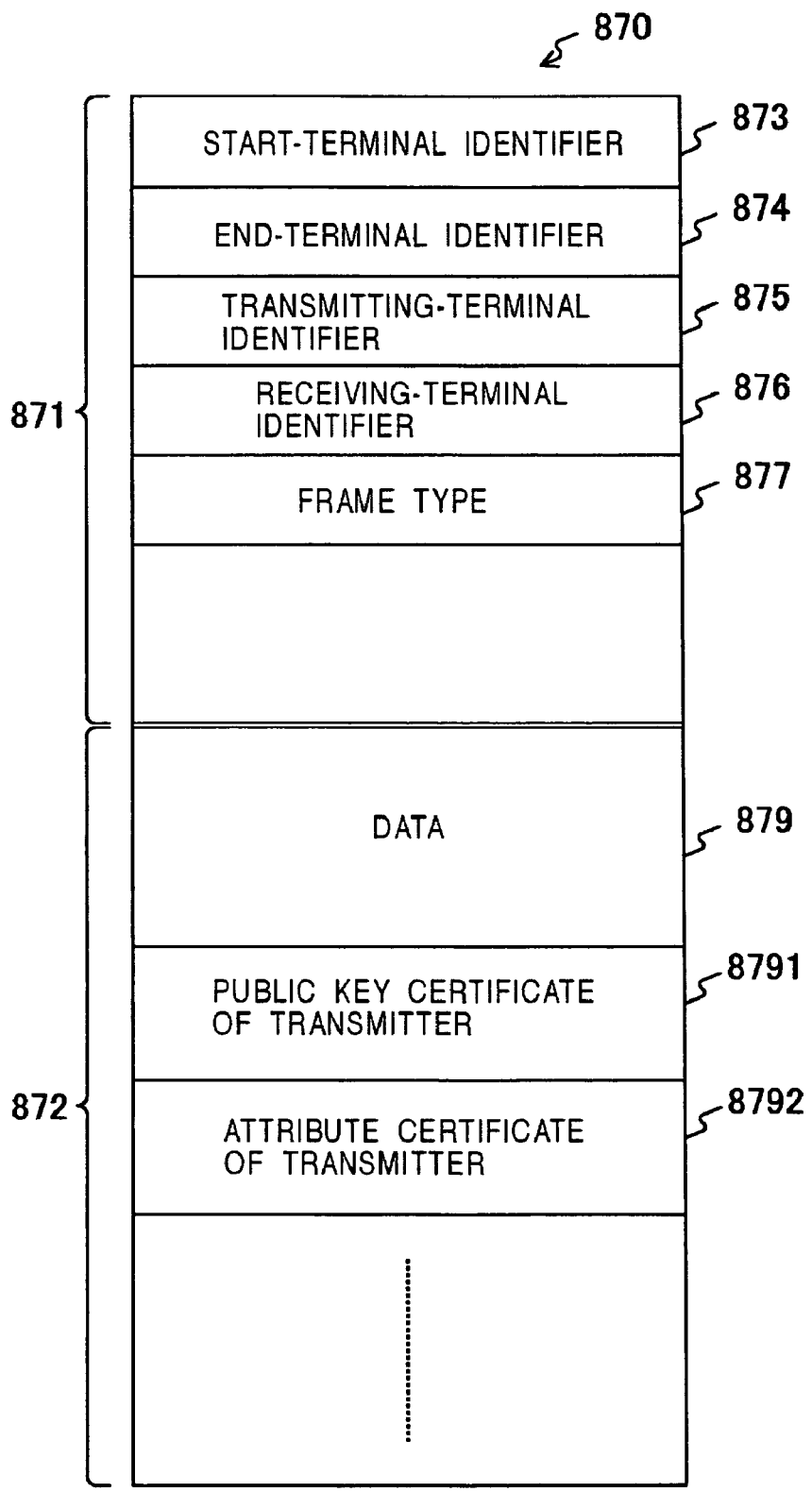
FIG. 19 is an illustration showing the structure of an authentication request frame 870 according to the embodiment of the present invention.

Upon receiving (111) the beacon 2111 transmitted from the terminal B, the terminal A checks the presence of attribute certificate 818 of the beacon frame 810. If it is determined that the terminal B has an attribute certificate, the terminal A transmits (112) an authentication request message 1122 for authenticating the terminal A to the terminal B. FIG. 19 shows the frame structure of the authentication request message 1122. An authentication request frame 870 is constituted by a header portion 871 and a payload portion 872. The header portion 871 includes a start-terminal identifier 873, an end-terminal identifier 874, a transmitting-terminal identifier 875, a receiving-terminal identifier 876, and a frame type 877. The details of the header portion 871 are similar to those of the attribute-certificate issuance suggestion frame 820 described with reference to FIG. 9. In the authentication request frame 870, data 879 in the payload portion 872 includes a public key certificate 8791 and an attribute certificate 8792 of the transmitting terminal A. The public key certificate 8791 of the terminal A is stored in advance in the generated-key table 650 of the terminal A, and the attribute certificate 8792 of the terminal A is stored in advance in the attribute certificate table 620 of the terminal A.

Upon receiving the authentication request message 1122 transmitted from the terminal A, the terminal B authenticates (212) the terminal A from the content. More specifically, the public key of the attribute certificate authority is extracted from the public key certificate 612 of the attribute-certificate-issuing-terminal list table 610 (see FIG. 2), and the signature 729 (see FIG. 4) of the attribute certificate 8792 included in the authentication request message 1122 is decoded using the extracted public key to obtain a message digest at the signature time. Then, a message digest of the attribute certification information 721 (see FIG. 4) of the attribute certificate 8792 is newly generated. The newly generated message digest is checked for the conformity to the message digest at the signature time. If a match is not found between these message digests, the attribute certificate can be tampered with after the signature, and the attribute certificate verification fails. If a match is found, the owner public key certificate identifier 723 (see FIG. 4) of the attribute certificate 8792 included in the authentication request message 1122 is further checked for the conformity to the issuer 714 and the serial number 712 (see FIG. 3) of the public key certificate 8791 included in the authentication request message 1122. If a match is found, it is verified that the terminal A, which is the owner of the public key certificate, is also the owner of the attribute certificate. If a match is not found, the terminal A is not the owner of the attribute certificate, and the attribute certificate verification fails.

In verifying the attribute certificate, it is necessary to confirm that the attribute certificate is not included in the attribute-certificate revocation list table 630. If the issuer 724 and the serial number 722 (see FIG. 4) of the attribute certificate 8792 are included in the attribute certificate identifier 631 of the attribute-certificate revocation list table 630 (see FIG. 5), the attribute certificate 8792 must have been revoked at the revocation time 632. Therefore, in this case, the attribute certificate verification fails.

Figure 20:
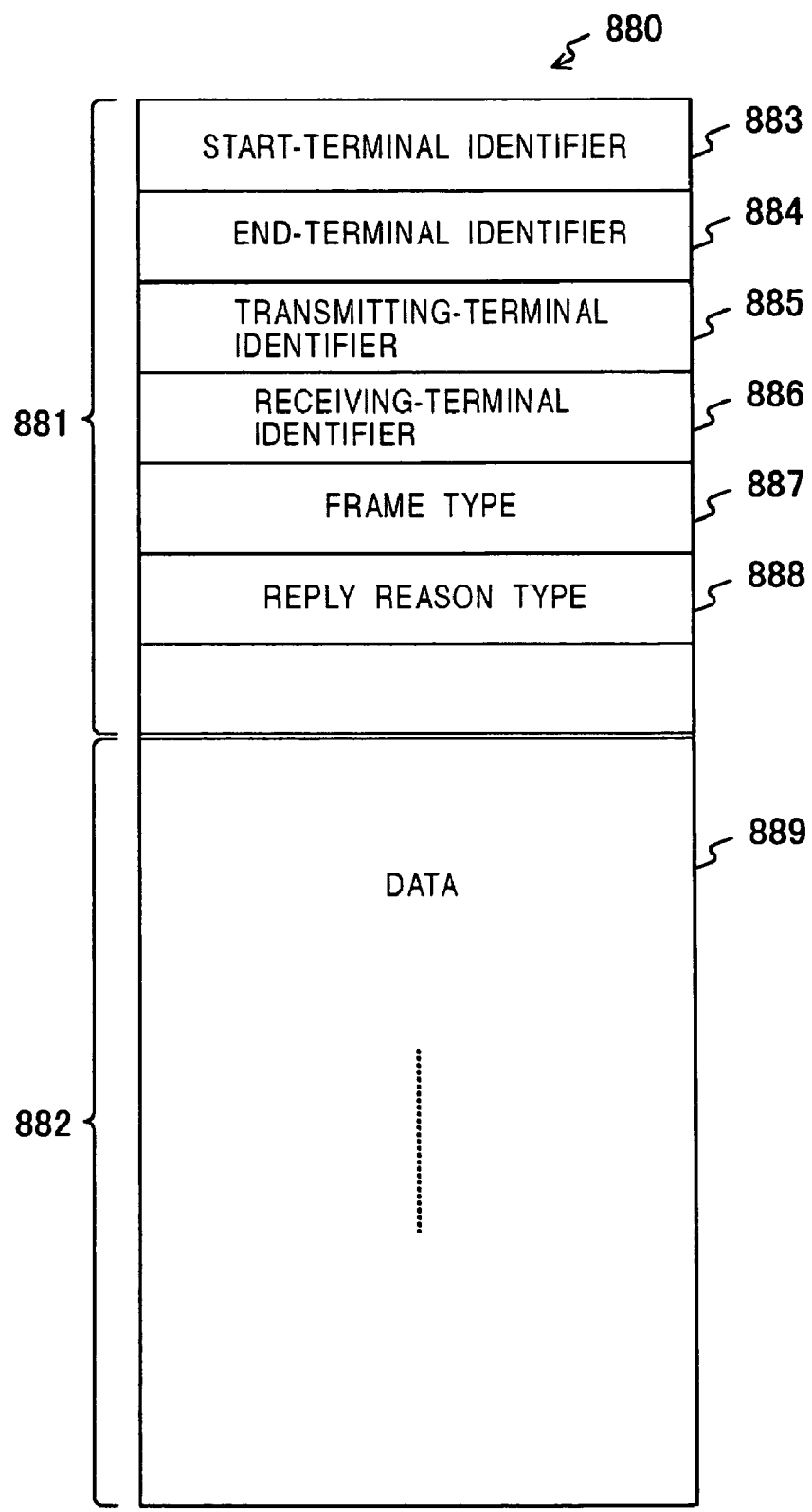
FIG. 20 is an illustration showing the structure of an authentication reply frame 880 according to the embodiment of the present invention.

If the authentication (212) of the terminal A succeeds, the terminal B transmits (213) an authentication-success message 2131 for notifying a success in the authentication of the terminal A to the terminal A. FIG. 20 shows an authentication reply frame structure of the authentication-success message 2131. An authentication reply frame 880 is constituted by a header portion 881 and a payload portion 882. The header portion 881 includes a start-terminal identifier 883, an end-terminal identifier 884, a transmitting-terminal identifier 885, a receiving-terminal identifier 886, and a frame type 887. The details of the header portion 881 are similar to those of the attribute-certificate issuance suggestion frame 820 described with reference to FIG. 9. In the authentication-success message 2131, the frame type 887 indicates an authentication-success frame. The authentication reply frame 880 further includes a reply reason type 888, which is not required when the authentication succeeds.

If the attribute certificate verification (212) of the terminal A fails, the terminal B transmits an authentication-error message for notifying a success in the authentication of the terminal A to the terminal A. The authentication reply frame structure of the authentication-error message is described above with reference to FIG. 20. However, in the authentication-error message, the frame type 887 indicates an authentication-error frame, and the reply reason type 888 includes coded reasons of the authentication error, such as inconformity of the message digests of the attribute certificate and revocation of the attribute certificate. The authentication-success message 2131 or the authentication-error message is received and checked (113) by the terminal A.

If the attribute certificate verification (212) of the terminal A succeeds, the terminal B further transmits (214) an authentication request message 2141 to the terminal A to authenticate the terminal B. The frame structure of the authentication request message 2141 is similar to that described with reference to FIG. 19, and the public key certificate 8791 and the attribute certificate 8792 of the transmitting terminal B are contained.

Upon receiving the authentication request message 2141 transmitted from the terminal B, the terminal A authenticates (114) the terminal B from the content. As described above, the authentication includes verification of the attribute certificate, confirmation of the owner of the attribute certificate, confirmation of the attribute-certificate revocation list table 630, and so on.

If the authentication (114) of the terminal B succeeds, the terminal A transmits (115) an authentication-success message 1152 for notifying a success in the authentication of the terminal B to the terminal B. The authentication reply frame structure of the successful-authentication message 1152 is similar to that described with reference to FIG. 20. If the attribute certificate verification (114) of the terminal B fails, the terminal A transmits an authentication-error message for notifying a success in the authentication of the terminal B to the terminal B. The authentication reply frame structure of the authentication-error message is also similar to that described with reference to FIG. 20. The authentication-success message 1152 or the authentication-error message is received and checked (215) by the terminal B.

When one of the terminal A and the terminal B has successfully authenticated the other terminal, and vice versa, the mutual authentication procedure is finished. After the mutual authentication procedure, the descriptions of the attribute-certificate-issuing-terminal list table 610 and the attribute-certificate revocation list table 630 are exchanged and merged. A new attribute-certificate issuing terminal broadcasts a public key certificate of this terminal to all terminals. As described above, a terminal that issues the attribute-certificate revocation list broadcasts the attribute-certificate revocation list to other terminals. Therefore, the conformity of the descriptions of the attribute-certificate-issuing-terminal list table 610 and the attribute-certificate revocation list table 630 of the terminals connecting to the network is maintained.

The operation flow of each terminal in the wireless ad-hoc communication system according to the embodiment of the present invention will now be described with reference to the drawings.

Figure 21:
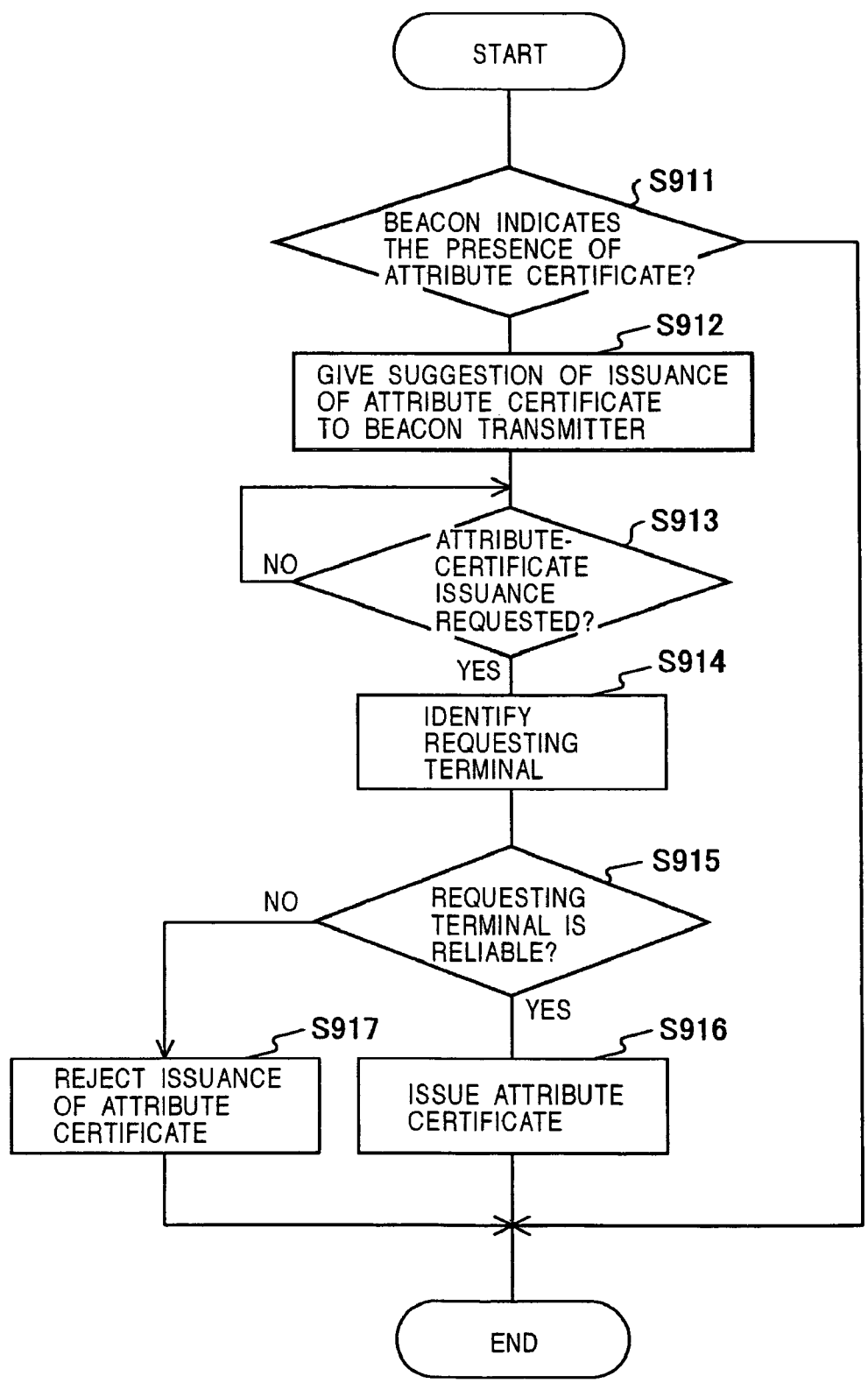
FIG. 21 is a flowchart showing the operation flow of an attribute-certificate issuing terminal in the initial registration according to the first example of the embodiment of the present invention.

FIG. 21 is a flowchart showing the operation of an attribute-certificate issuing terminal in the first example of the initial registration sequence shown in FIG. 7. First, upon receiving a beacon from another terminal, it is determined whether or not the beacon indicates that the transmitting terminal of this beacon has an attribute certificate (step S911). If the beacon indicates that the transmitting terminal has an attribute certificate, it is not necessary to issue an attribute certificate, and the operation ends without performing the initial registration process. If the beacon does not indicate that the transmitting terminal has an attribute certificate, the start-terminal identifier of the beacon is checked, and a suggestion of an attribute-certificate issuing request is given to the transmitting terminal (step S912).

Then, if issuance of the attribute certificate is requested (step S913), information about the requesting terminal is displayed to prompt confirmation (step S914). If it is determined that the requesting terminal is a reliable terminal (step S915), the attribute certificate is issued to the requesting terminal (step S916). On the other hand, if the confirmation is rejected, the requesting terminal is notified of a rejection of the attribute-certificate issuing request (step S917).

Figure 22:
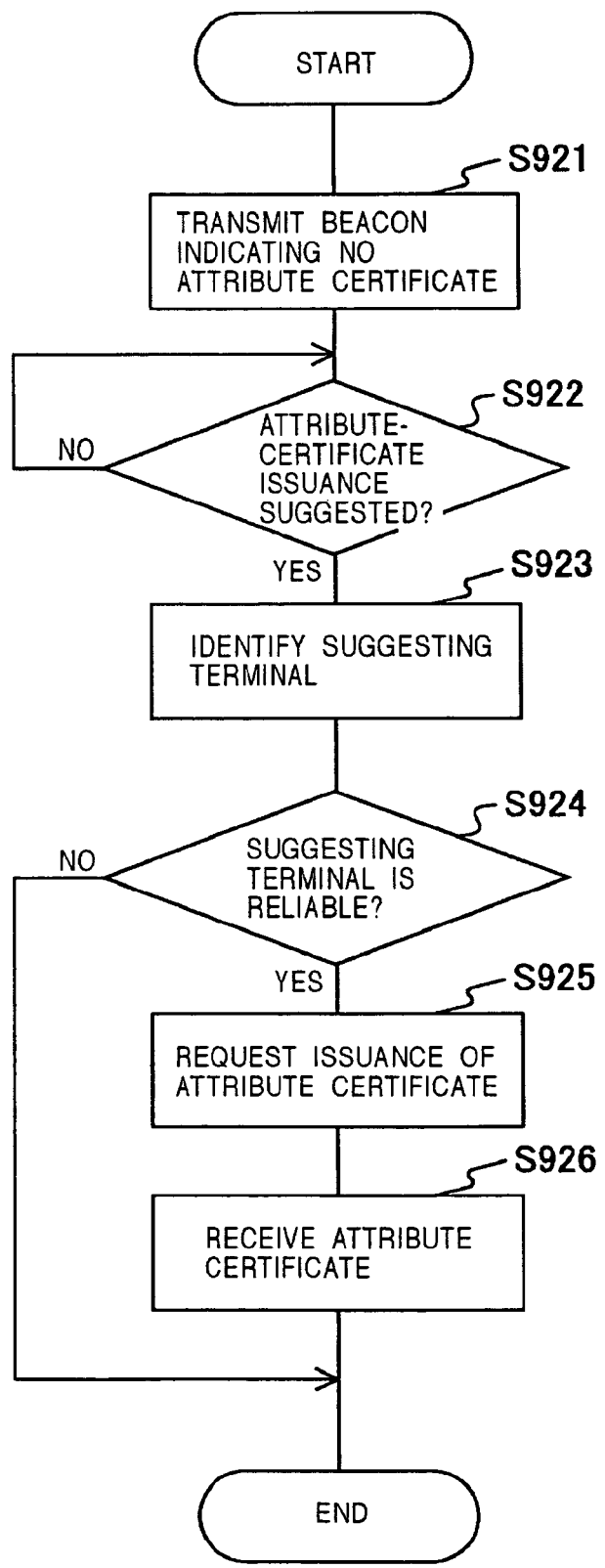
FIG. 22 is flowchart showing the operation flow of a new participating terminal in the initial registration according to the first example of the embodiment of the present invention.

FIG. 22 is a flowchart showing the operation of a new participating terminal in the first example of the initial registration sequence shown in FIG. 7. First, a beacon indicating that this terminal does not have an attribute certificate is transmitted (step S921). When issuance of an attribute certificate is suggested by another terminal in response to the beacon (step S922), the user is prompted to identify the suggesting terminal (step S923). If the transmitting terminal is a reliable terminal, confirmation for causing this terminal to issue the attribute certificate is performed (step S924). After this confirmation has been performed, the transmitting terminal is requested to issue an attribute certificate (step S925). Thus, the attribute certificate can be issued (step S926). On the other hand, if this confirmation has not been performed, the initial registration process is not finished, and no attribute certificate is issued.

Figure 23:
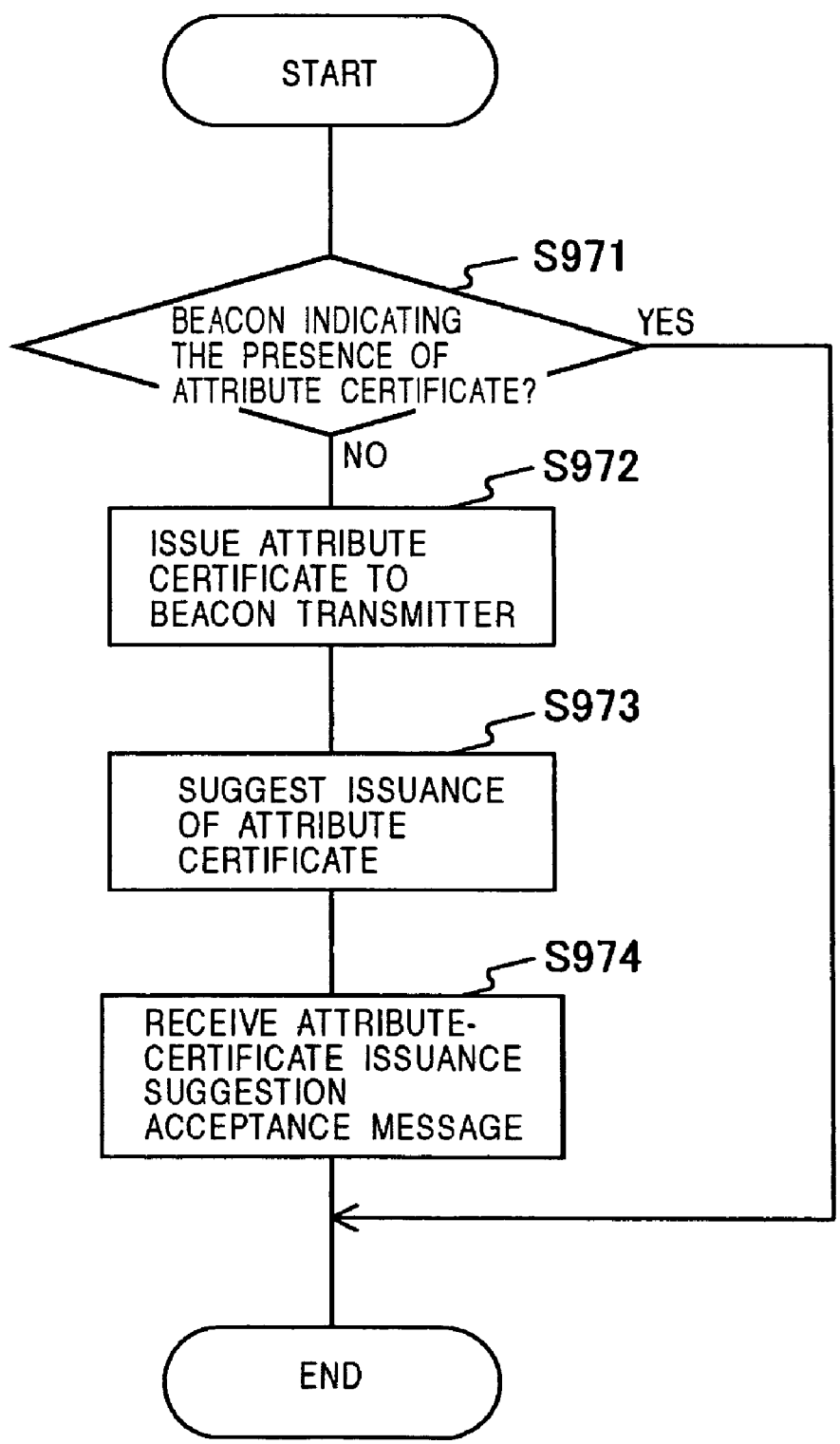
FIG. 23 is a flowchart showing the operation flow of an attribute-certificate issuing terminal in the initial registration according to the modification of the first example of the embodiment of the present invention.

FIG. 23 is a flowchart showing the operation of an attribute-certificate issuing terminal in the modification of the first example of the initial registration sequence shown in FIG. 12. First, upon receiving a beacon from another terminal, it is determined whether or not the beacon indicates that the transmitting terminal of this beacon has an attribute certificate (step S971). If the beacon indicates that the transmitting terminal has an attribute certificate, it is not necessary to issue an attribute certificate, and the operation ends without performing the initial registration process. If the beacon does not indicate that the transmitting terminal has an attribute certificate, the start-terminal identifier of the beacon is checked, and an attribute certificate is issued to the transmitting terminal (step S972), and a suggestion message containing this attribute certificate is transmitted (step S973).

Figure 24:
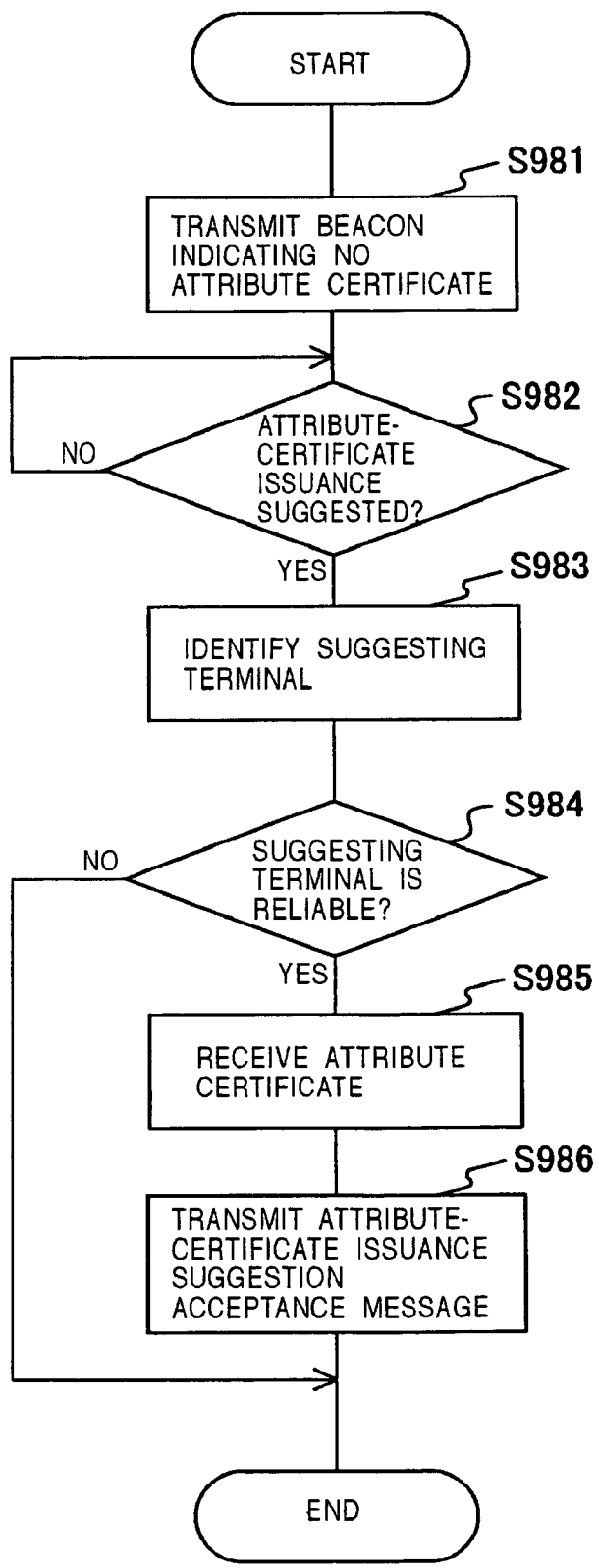
FIG. 24 is a flowchart showing the operation flow of a new participating terminal in the initial registration according to the modification of the first example of the embodiment of the present invention.

FIG. 24 is a flowchart showing the operation of a new participating terminal in the modification of the first example of the initial registration shown in FIG. 12. First, a beacon indicating that this terminal does not have an attribute certificate is transmitted (step S981). When issuance of an attribute certificate is suggested by another terminal in response to the beacon (step S982), the user is prompted to identify the suggesting terminal (step S983). If the transmitting terminal is a reliable terminal (step S984), the attribute certificate issued by this terminal is received (step S985), and a message indicating that the attribute certificate has been received is transmitted to the transmitting terminal (step S986).

Figure 25:
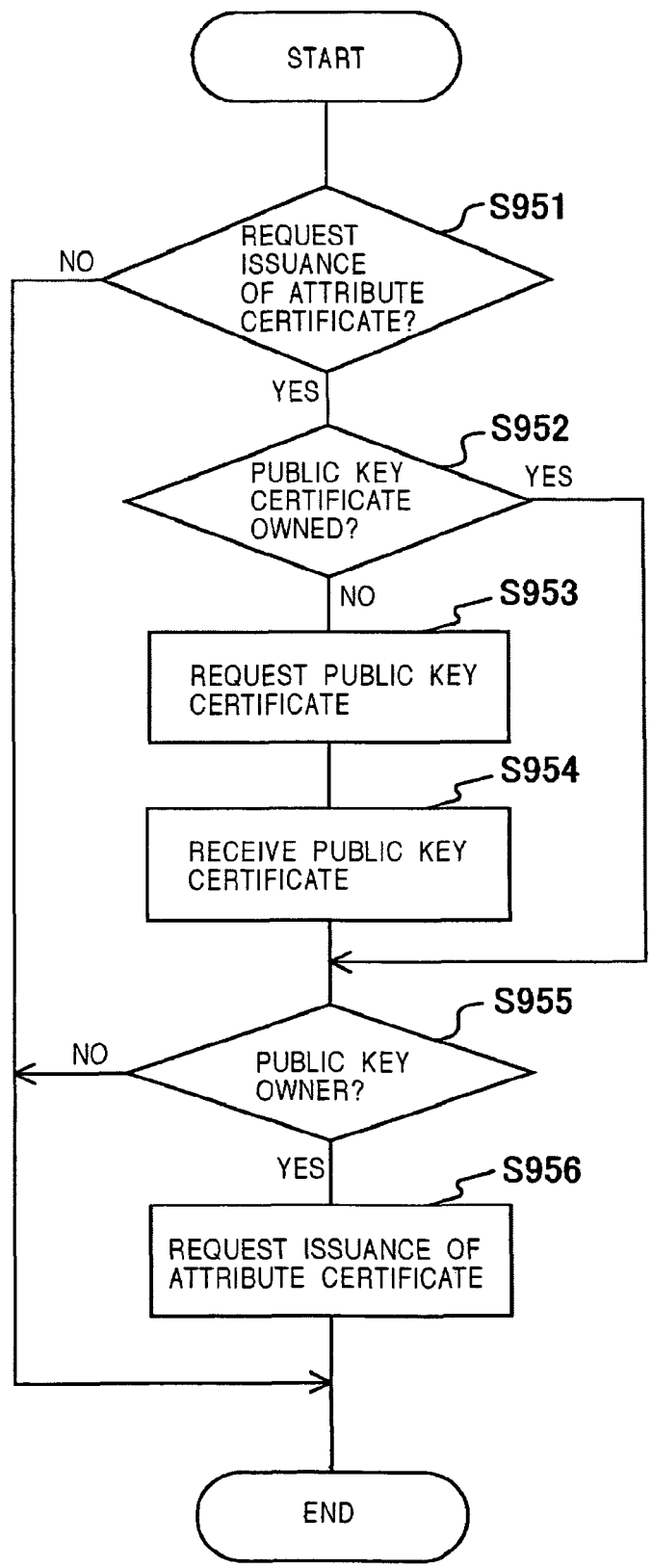
FIG. 25 is a flowchart showing the operation flow of a new participating terminal in the initial registration according to the second example of the embodiment of the present invention.

FIG. 25 is a flowchart showing the operation of a new participating terminal in the second example of the initial registration sequence shown in FIG. 15. First, the start-terminal identifier 813 (see FIG. 8) of the received beacon is checked, and it is determined whether or not the transmitting terminal of the beacon is requested to issue an attribute certificate (step S951). If the issuance is not desired, the process ends. If the new participating terminal does not have a public key certificate of the beacon transmitting terminal (step S952), the beacon transmitting terminal is requested to send the public key certificate (step S953), and the public key certificate is received (step S954).

Then, if the public key contained in the public key certificate is that of the beacon transmitting terminal and if it is determined that this terminal is desired to issue an attribute certificate (step S955), the transmitting terminal is requested to issue an attribute certificate (step S956). Thus, the attribute certificate can be issued. On the other hand, if it is not determined that the public key is that of the beacon transmitting terminal, issuance of an attribute certificate is not requested.

Figure 26:
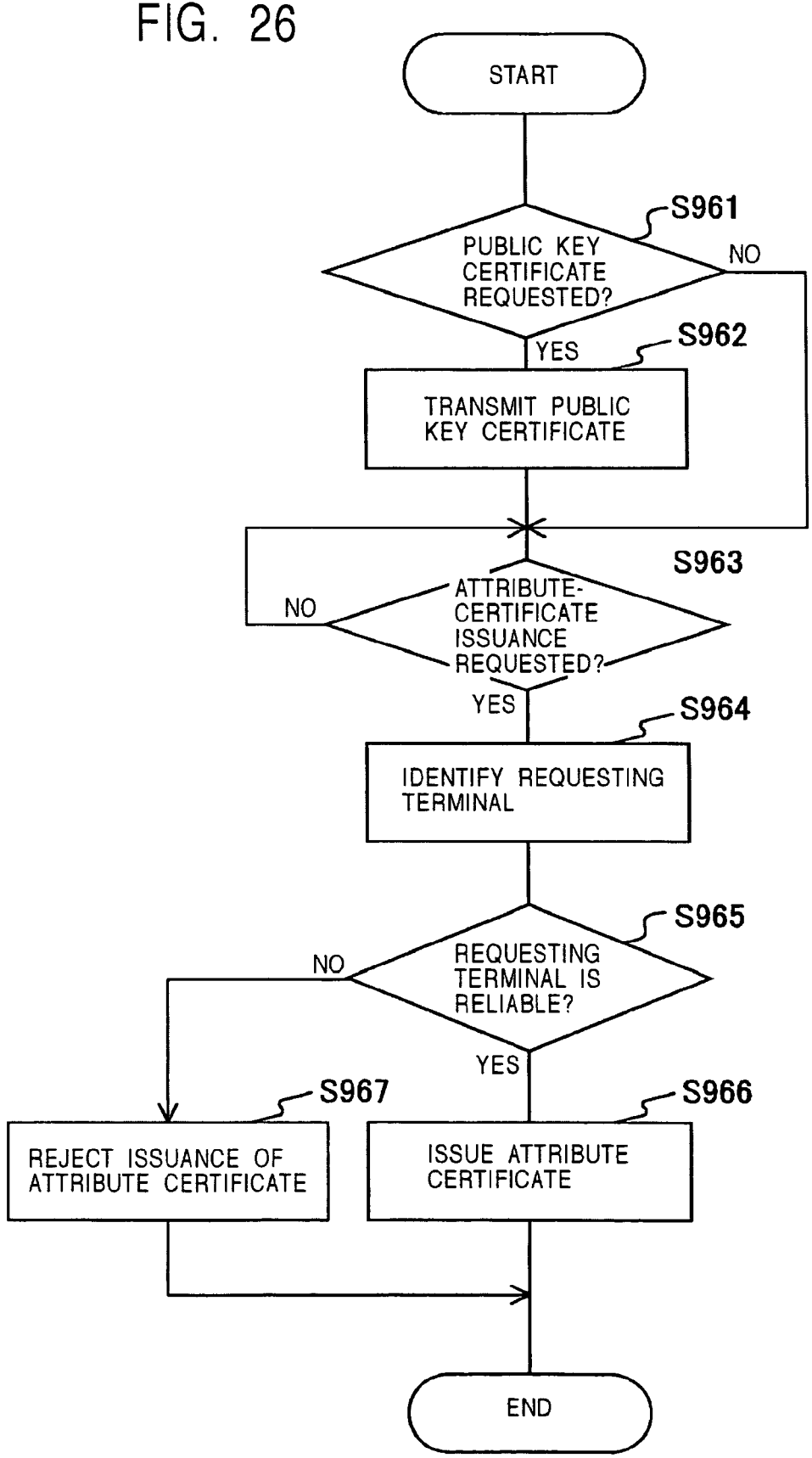
FIG. 26 is a flowchart showing the operation flow of an attribute-certificate issuing terminal in the initial registration according to the second example of the embodiment of the present invention.

FIG. 26 is a flowchart showing the operation of an attribute-certificate issuing terminal in the second example of the initial registration sequence shown in FIG. 15. First, when a public key certificate is requested from another terminal (step S961), the public key certificate is transmitted in response to the request (step S962). Then, when issuance of an attribute certificate is requested (step S963), information about the requesting terminal is displayed to prompt confirmation (step S964). If it is determined that the requesting terminal is a reliable terminal (step S965), an attribute certificate is issued to the requesting terminal (step S966). On the other hand, if the confirmation is rejected, the requesting terminal is notified of a rejection of the attribute-certificate issuing request (step S967).

Figure 27:
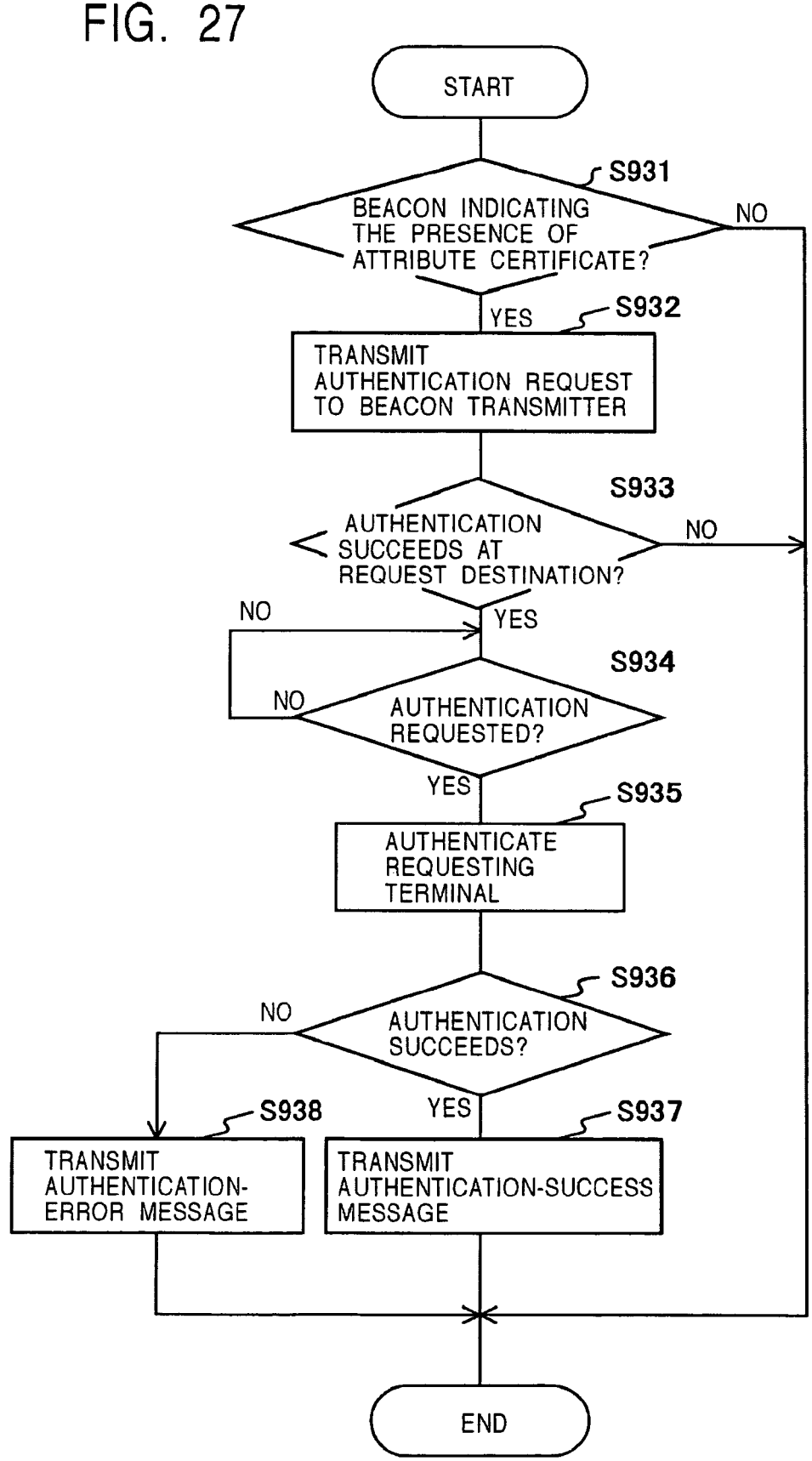
FIG. 27 is a flowchart showing the operation flow of a beacon receiving terminal in mutual authentication according to the embodiment of the present invention.

FIG. 27 is a flowchart showing the operation of a beacon receiving terminal in the mutual authentication sequence shown in FIG. 18. First, upon receiving a beacon from another terminal, it is determined whether or not the beacon indicates that the transmitting terminal of this beacon has an attribute certificate (step S931). If the beacon does not indicate that the transmitting terminal has an attribute certificate, mutual authentication cannot be performed, and the operation ends without performing the mutual authentication process. In this case, issuance of an attribute certificate is suggested by an attribute-certificate issuing terminal. On the other hand, if the beacon indicates that the transmitting terminal has an attribute certificate, an authentication request is transmitted to the beacon transmitting terminal (step S932). If the authentication of the beacon transmitting terminal fails, the mutual authentication process is not finished (step S933), and both terminals cannot set up a network. On the other hand, if the authentication of the beacon transmitting terminal succeeds, then, an authentication request is transmitted from the beacon transmitting terminal.

Upon receiving the authentication request (step S934), the beacon transmitting terminal serving as an authentication requester is authenticated (step S935). If the authentication succeeds (step S936), an authentication-success message is transmitted to the authentication requesting terminal (i.e., the beacon transmitting terminal) (step S937). If the authentication fails (step S936), an authentication-error message is transmitted to the authentication requesting terminal (step S938).

Figure 28:
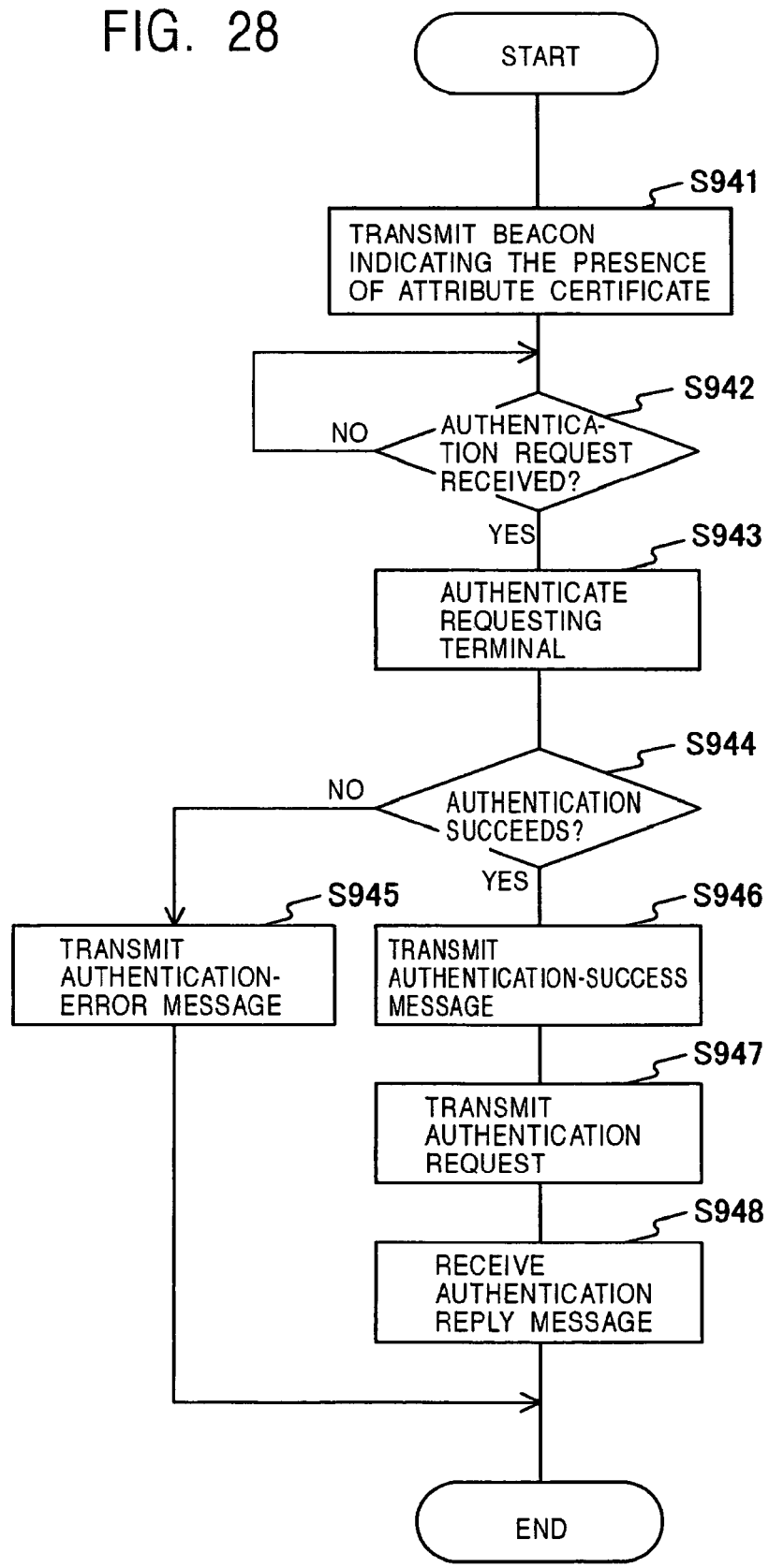
FIG. 28 is a flowchart showing the operation flow of a beacon transmitting terminal in the mutual authentication according to the embodiment of the present invention.
Figure 29A:
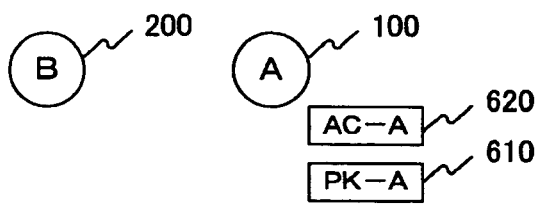
FIGS. 29A to 29D are illustrations showing a process for terminals to set up a network in the wireless ad-hoc communication system according to the embodiment of the present invention.
Figure 29B:
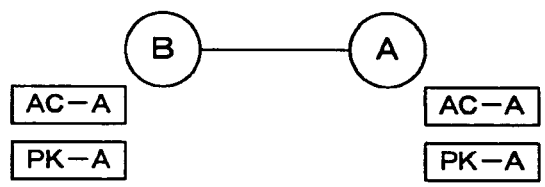
Figure 29C:
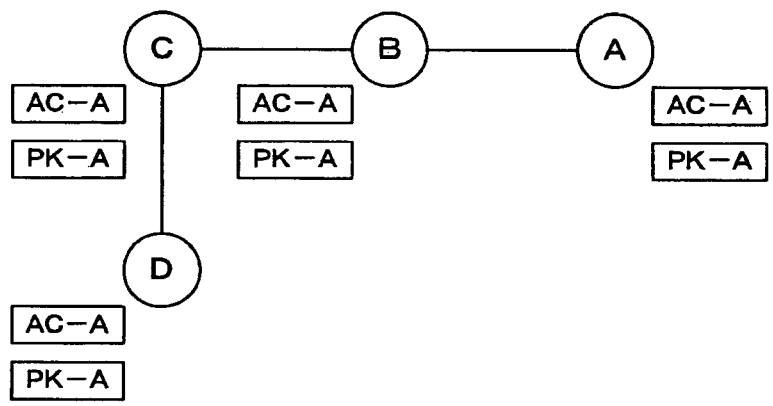
Figure 29D:
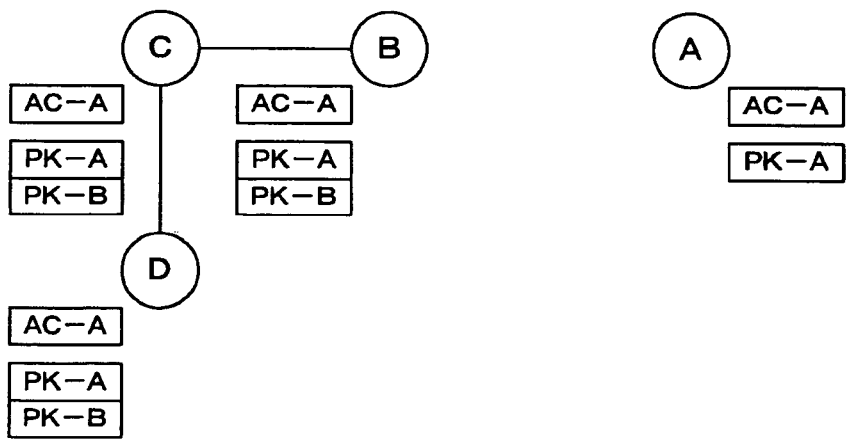

FIG. 28 is a flowchart showing the operation of a beacon transmitting terminal in the mutual authentication sequence shown in FIG. 18. First, a beacon indicating that this terminal has an attribute certificate is transmitted (step S941). Then, when an authentication request from another terminal in response to the beacon is received (step S942), the beacon receiving terminal serving as an authentication requester is authenticated (step S943). If the authentication fails (step S944), an authentication-error message is transmitted to the authentication requesting terminal (i.e., the beacon receiving terminal) (step S945). On the other hand, if the authentication succeeds (step S944), an authentication-success message is transmitted to the authentication requesting terminal (step S946), and an authentication request is transmitted to the beacon receiving terminal (step S947). Then, a reply to the authentication request is transmitted from the beacon receiving terminal (step S948).

A connection relationship between terminals in the wireless ad-hoc communication system according to the embodiment of the present invention will now be described with reference to the drawings.

FIGS. 29A to 29D are illustrations showing the process in which terminals set up a network in the wireless ad-hoc communication system. First, it is assumed that a terminal A (100) functions as an attribute-certificate issuing terminal. A public key certificate (PK-A) of the terminal A is stored in the attribute-certificate-issuing-terminal list table 610 of the terminal A, and an attribute certificate (AC-A) issued by the terminal A is stored in the attribute-certificate table 620 of the terminal A (see FIG. 29A). When a terminal B (200) transmits a beacon, the attribute certificate is issued from the terminal A to the terminal B. As a result of initial registration, the public key certificate (PK-A) of the terminal A is stored in the attribute-certificate-issuing-terminal list table 610 of the terminal B, and the attribute certificate (AC-A) issued by the terminal A is stored in the attribute-certificate table of the terminal B (see FIG. 29B). After the initial registration, mutual authentication is performed, and the terminal A and the terminal B set up a network in the wireless ad-hoc communication system.

Then, when a terminal C transmits a beacon, the attribute certificate is issued from the terminal A to the terminal C via the terminal B. After initial registration, the terminal C performs mutual authentication with, for example, the terminal B, and participates in the network in the wireless ad-hoc communication system (see FIG. 29C). When a terminal C further transmits a beacon, the terminal D participates in the network in the wireless ad-hoc communication system by a similar procedure (see FIG. 29C).

If the terminal A serving as an attribute-certificate issuing terminal is disconnected from the network due to any reason, another terminal serves as an attribute-certificate issuing terminal. A variety of standards for selecting an attribute-certificate issuing terminal are conceivable. For example, a terminal that is in the center position at a certain time, a terminal that has the longest battery life, or the like may be selected. For example, if the terminal B is selected as an attribute-certificate issuing terminal, the terminal B broadcasts a public key certificate (PK-B) of the terminal B to all connecting terminals. The terminals store the public key certificate (PK-B) of the terminal B and a terminal identifier of the terminal B in the attribute-certificate-issuing-terminal list table 610 (see FIG. 29D).

Figure 30A:
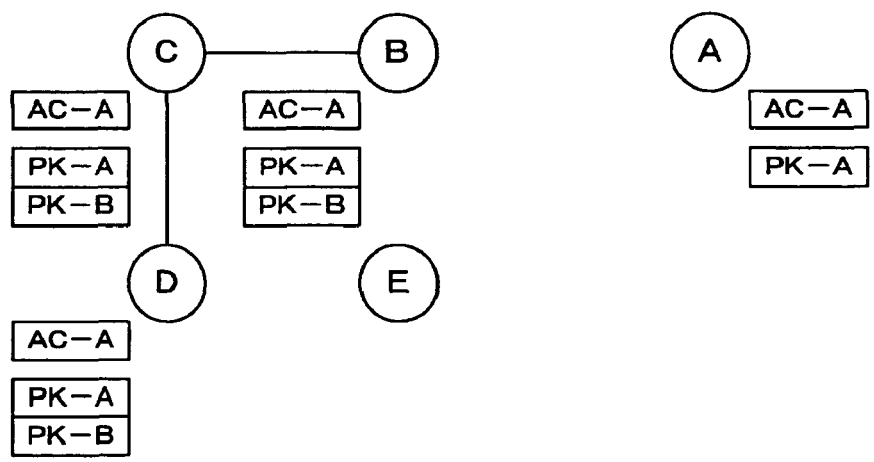
FIGS. 30A to 30C are illustrations showing a process for a disconnected terminal to access again a network in the wireless ad-hoc communication system according to the embodiment of the present invention.
Figure 30B:
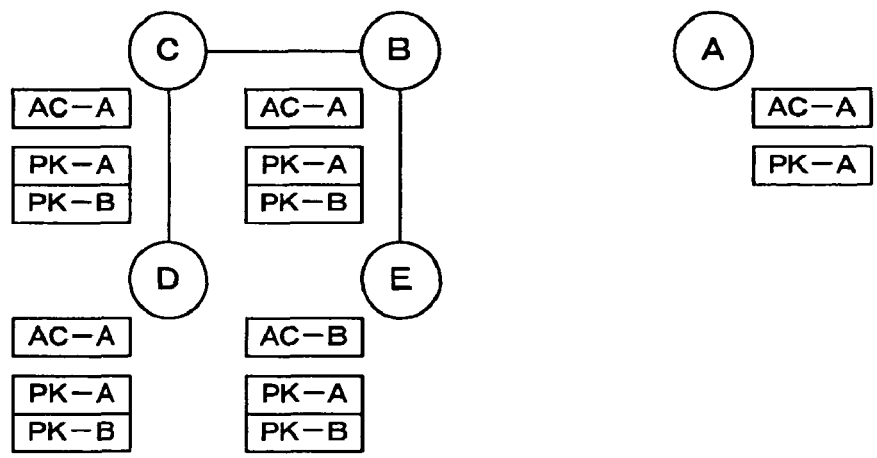
Figure 30C:
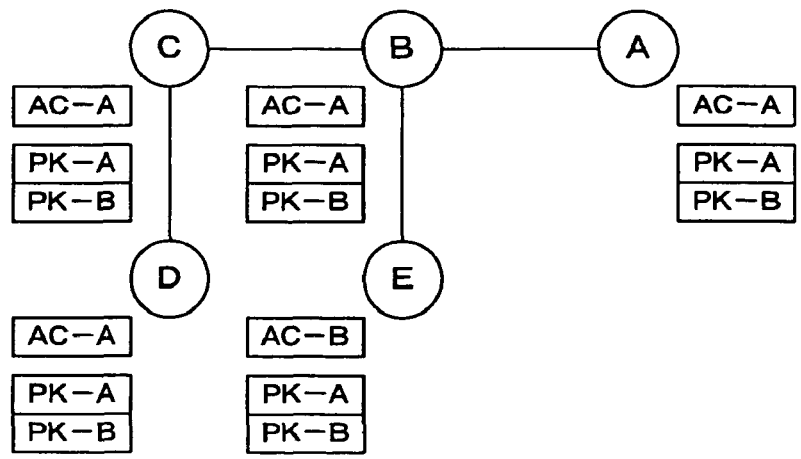

FIGS. 30A to 30C are illustrations showing the process in which a disconnected terminal participates in a network in the wireless ad-hoc communication system again. After a terminal A is disconnected and a terminal B serves as an attribute-certificate issuing terminal, when a terminal E transmits a beacon (see FIG. 30A), an attribute certificate is issued from the terminal B to the terminal E. As a result of initial registration, the public key certificate (PK-B) of the terminal B serving as the current attribute-certificate issuing terminal and the public key certificate (PK-A) of the terminal A serving as the previous attribute-certificate issuing terminal are stored in the attribute-certificate-issuing-terminal list table 610 of the terminal E. The attribute certificate (AC-B) issued by the terminal B is also stored in the attribute-certificate table of the terminal E (see FIG. 30B).

Then, when the terminal A connects to the network again, the terminal A performs authentication using the stored attribute certificate (AC-A) issued by the terminal A. After mutual authentication, the terminal A communicates with the terminal B to update the attribute-certificate-issuing-terminal list table 610. Therefore, the public key certificate (PK-B) of the terminal B is newly stored in the attribute-certificate-issuing-terminal list table 610 of the terminal A (see FIG. 30C).

According to the embodiment of the present invention, therefore, upon receiving a beacon, an attribute-certificate issuing terminal checks for the presence of attribute certificate 818 of the beacon frame 810 (see FIG. 8). If it is determined that the beacon transmitting terminal does not have an attribute certificate, the attribute-certificate issuance suggestion frame 820 (see FIG. 9) for suggesting an attribute-certificate issuing request is transmitted to the beacon transmitting terminal. Thus, these frames act as a trigger to independently and dispersedly issue the attribute certificate.

While the embodiment of the present invention has been described by way of example, the present invention is not limited to the form described above, and a variety of modifications may be made without departing from the scope of the present invention.

The operation procedures described above may be regarded as a method having the series of procedures, or may be regarded as a program for causing a computer (or a terminal) to execute the series of procedures or a recording medium that stores the program.

INDUSTRIAL APPLICABILITY

As an application of the present invention, the present invention is applicable to, for example, a case in which a terminal-authorization-certificate is issued between terminals in a wireless ad-hoc communication system.

The invention claimed is:

1. A wireless ad-hoc communication system, comprising:
 a first terminal that transmits a signal to a broadcast address which does not specify a particular terminal, said signal including beacon information indicating whether or not the first terminal has a terminal-authorization-certificate for a network that is accessed by a plurality of terminals and the terminal-authorization-certificate is used by each of the plurality of terminals to determine access rights to the network; and
 a second terminal from the plurality of terminals that is configured to receive the signal and detect whether or not the terminal-authorization-certificate is present at the first terminal based on the beacon information, and to transmit, when the second terminal determines that the terminal-authorization-certificate is not present, a suggestion message prompting the first terminal to request the terminal-authorization-certificate, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

2. The wireless ad-hoc communication system according to claim 1, wherein the suggestion message causes identification information of the first terminal to be displayed on the first terminal and prompts a user of the first terminal to decide whether or not to request the terminal-authorization-certificate.

3. A terminal comprising:

a receiving unit configured to receive a signal from a second terminal addressed to a broadcast address which does not specify a particular terminal, said signal including beacon information, and detect whether or not a terminal-authorization-certificate is present at the second terminal based on the beacon information; and a terminal-authorization-certificate issuance suggesting unit configured to, when the receiving unit determines that the terminal-authorization-certificate is not present at the second terminal, issue a suggestion message to the second terminal that includes the terminal-authorization-certificate that gives access rights to the second terminal to access a network of the terminal, wherein the network is accessed by a plurality of terminals including the terminal and the terminal authorization-certificate is used by each of the plurality of terminals to determine access rights to the network, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

4. The terminal according to claim 3, further comprising a unit configured to obtain terminal identification information of the second terminal from the signal received by the receiving unit from the second terminal, wherein the terminal-authorization-certificate issuance suggesting unit transmits the suggestion message based on the terminal identification information.

5. The terminal according to claim 3, wherein the terminal-authorization-certificate issuance suggesting unit further provides a public key certificate of the terminal when transmitting the suggestion message to the second terminal.

6. A terminal comprising:

a receiving unit configured to receive a signal from a second terminal addressed to a broadcast address which does not specify a particular terminal, said signal including beacon information, and detect whether or not a terminal-authorization-certificate is present at the second terminal based on the beacon information; and a terminal-authorization-certificate issuance suggesting unit configured to, when the receiving unit determines that the terminal-authorization-certificate is not present at the second terminal, transmit a suggestion message prompting the second terminal to request the terminal-authorization-certificate, wherein said terminal-authorization-certificate is for a network that is accessed by a plurality of terminals including the terminal and the terminal authorization-certificate is used by each of the plurality of terminals to determine access rights to the network, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

7. The terminal according to claim 6, further comprising a unit configured to obtain terminal identification information of the second terminal from the signal received by the receiving unit from the second terminal, wherein the terminal-authorization-certificate issuance suggesting unit transmits the suggestion message based on the terminal identification information.

8. The terminal according to claim 6, wherein the terminal-authorization-certificate issuance suggesting unit further provides a public key certificate of the terminal when transmitting the suggestion message to the second terminal.

9. The terminal according to claim 8, further comprising:

a terminal-authorization-certificate issuance request receiving unit configured to receive a terminal-authorization-certificate issuing request;

a confirming unit configured to, when the terminal-authorization-certificate issuance request receiving unit receives a terminal-authorization-certificate issuing request from the second terminal, display information about the second terminal to prompt confirmation; and a terminal-authorization-certificate issuing unit configured to issue the terminal-authorization-certificate to the second terminal when the confirmation is successfully performed, and notify the second terminal of a rejection of the terminal-authorization-certificate issuing request when the confirmation is rejected.

10. The terminal according to claim 9, further comprising a terminal-authorization-certificate-issuing-terminal list table that stores the public key certificate of the issuing terminal, wherein the terminal-authorization-certificate issuing unit transmits the public key certificate of the issuing terminal stored in the terminal-authorization-certificate-issuing-terminal list table to the second terminal when issuing the terminal-authorization-certificate.

11. The terminal according to claim 9, further comprising a terminal-authorization-certificate revocation list table that stores a terminal-authorization-certificate revocation list, wherein the terminal-authorization-certificate issuing unit transmits the terminal-authorization-certificate revocation list stored in the terminal-authorization-certificate revocation list table to the second terminal when issuing the terminal-authorization-certificate.

12. A terminal comprising:
a transmitting unit configured to transmit a signal addressed to a broadcast address which does not specify a particular terminal, said signal including beacon information indicating-whether or not the terminal has a terminal-authorization-certificate for a network that is shared by a plurality of terminals and the terminal authorization-certificate is used by each of the plurality of terminals to determine access rights to the network;

a terminal-authorization-certificate issuance suggestion receiving unit configured to receive a suggestion message from a second terminal in response to the signal prompting the terminal to request the terminal-authorization-certificate, wherein the second terminal detects whether or not the terminal-authorization-certificate is present at the terminal based on the beacon information and transmits the suggestion message when it is determined that the terminal-authorization-certificate is not present at the terminal;

a confirming unit configured to, when the terminal-authorization-certificate issuance suggestion receiving unit receives the suggestion message from the second terminal of the plurality of terminals, display information about the second terminal to prompt confirmation; and a terminal-authorization-certificate issuance requesting unit configured to request the second terminal to issue the terminal-authorization-certificate when the confirmation is successfully performed, and notify the second terminal of a rejection of the terminal-authorization-certificate issuance suggestion when the confirmation is rejected, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

13. The terminal according to claim 12, wherein the terminal-authorization-certificate issuance requesting unit further provides a public key certificate of the terminal when requesting the second terminal to issue the terminal-authorization-certificate.

14. A terminal comprising:
a transmitting unit configured to transmit a signal addressed to a broadcast address which does not specify a particular terminal, said signal including beacon information indicating whether or not the terminal has a terminal-authorization-certificate for a network that is shared by a plurality of terminals and the terminal authorization-certificate is used by each of the plurality of terminals to determine access rights to the network;

a terminal-authorization-certificate issuance suggestion receiving unit configured to receive a suggestion message from a second terminal, in response to the signal, prompting the terminal to request the terminal-authorization-certificate, wherein the second terminal detects whether or not the terminal-authorization-certificate is present at the terminal based on the beacon information and transmits the suggestion message when it is determined that the terminal-authorization-certificate is not present at the terminal;

a confirming unit configured to, when the terminal-authorization-certificate issuance suggestion receiving unit receives the suggestion message from the second terminal, display information about the second terminal to prompt confirmation; and a terminal-authorization-certificate issuance requesting unit configured to, after the confirmation, when the suggestion message includes the terminal-authorization-certificate, receive the terminal-authorization-certificate, and when the suggestion message does not include the terminal-authorization-certificate, request the second terminal to issue the terminal-authorization-certificate, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

15. The terminal according to claim 14, wherein the terminal-authorization-certificate issuance requesting unit further provides a public key certificate of the terminal when requesting the second terminal to issue the terminal-authorization-certificate.

16. A terminal comprising:
a receiving unit configured to receive a signal from a second terminal addressed to a broadcast address which does not specify a particular terminal, said signal including beacon information, and detect whether or not a terminal-authorization-certificate is present at the second terminal based on the beacon information; and a terminal-authorization-certificate issuance requesting unit configured to, when the receiving unit determines that the terminal-authorization-certificate is present at the second terminal, request the second terminal to issue the terminal-authorization-certificate for a network that is shared by a plurality of terminals including the second terminal and the terminal authorization-certificate is used by each of the plurality of terminals to determine access rights to the network, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

17. The terminal according to claim 16, further comprising a unit configured to obtain terminal identification information of the second terminal from the signal received by the receiving unit from the second terminal, wherein the terminal-authorization-certificate issuance requesting unit requests the terminal-authorization-certificate based on the terminal identification information.

18. A terminal comprising:
a terminal-authorization-certificate table that stores a first terminal-authorization-certificate indicating access rights of the terminal for a network that is shared by a plurality of terminals including the terminal, the first terminal authorization-certificate is used by each of the plurality of terminals to determine access rights to the network;
a receiving unit configured to receive a signal from a second terminal addressed to a broadcast address which does not specify a particular terminal, said signal including beacon information, and detect whether or not a terminal-authorization-certificate is present at the second terminal based on the beacon information; and
an authentication requesting unit configured to, when the receiving unit receives the signal including beacon information from the second terminal, provide the first terminal-authorization-certificate stored in the terminal-authorization-certificate table and request the second terminal to authenticate the terminal when the signal indicates that the second terminal has a second terminal-authorization-certificate indicating access rights of the second terminal,
wherein one of the plurality of terminals is an issuing terminal which initially provides the first terminal-authorization-certificate to at least another of the plurality of terminals when setting up the network, and also provides a public key certificate for verifying ownership of the first terminal-authorization-certificate, said first terminal-authorization-certificate and public key certificate identifying the issuing terminal and being stored on each of the plurality of terminals in the network such that each of the plurality of terminals is configured to provide the first terminal-authorization-certificate to a new terminal seeking to access the network.

19. The terminal according to claim 18, further comprising:
a terminal-authorization-certificate-issuing-terminal list table that stores the public key certificate of the issuing terminal;
an authentication-request receiving unit configured to receive a second authentication request made by the second terminal in response to the authentication request of the authentication requesting unit; and
a verifying unit configured to verify the second terminal-authorization-certificate included in the second authentication request received by the authentication-request receiving unit using a public key included in the public key certificate stored in the terminal-authorization-certificate-issuing-terminal list table.

20. The terminal according to claim 19, further comprising a terminal-authorization-certificate revocation list table that stores a terminal-authorization-certificate revocation list,
wherein the verifying unit determines an authentication error when the second terminal-authorization-certificate has been revoked in the terminal-authorization-certificate revocation list stored in the terminal-authorization-certificate revocation list table.

21. A terminal comprising:
a terminal-authorization-certificate-issuing-terminal list table that stores a public key certificate of an issuing terminal;
a transmitting unit configured to transmit a signal addressed to a broadcast address which does not specify a particular terminal, said signal including beacon information indicating that the terminal has a second terminal-authorization-certificate to a second terminal having a first terminal-authorization-certificate;
a terminal-authorization-certificate table that stores the second terminal-authorization-certificate indicating access rights of the terminal for a network that is shared by a plurality of terminals including the terminal and the second terminal authorization-certificate is used by each of the plurality of terminals to determine access rights to the network;
an authentication-request receiving unit configured to receive a first authentication request from the second terminal in response to the signal, wherein the second terminal detects whether or not a terminal-authorization-certificate is present at the terminal based on the beacon information and transmits the authentication request when it is determined that the second terminal-authorization-certificate is present at the terminal;
a verifying unit configured to verify the first terminal-authorization-certificate included in the first authentication request received by the authentication-request receiving unit using a public key included in the public key certificate stored in the terminal-authorization-certificate-issuing-terminal list table; and
an authentication requesting unit configured to, when the verifying unit determines an authentication success, provide the second terminal-authorization-certificate stored in the terminal-authorization-certificate table to the second terminal and perform a second authentication request for requesting the second terminal to authenticate the terminal,
wherein one of the plurality of terminals in the network is the issuing terminal which initially provides the second terminal-authorization-certificate to at least another of the plurality of terminals when setting up the network, and also provides the public key certificate for verifying ownership of the second terminal-authorization-certificate, said second terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

22. The terminal according to claim 21, further comprising a terminal-authorization-certificate revocation list table that stores a terminal-authorization-certificate revocation list,
wherein the verifying unit determines an authentication error when the second terminal-authorization-certificate has been revoked in the terminal-authorization-certificate revocation list stored in the terminal-authorization-certificate revocation list table.

23. A method, implemented on a terminal, for suggesting issuance of a terminal-authorization-certificate, comprising the steps of:
receiving, at the terminal, a signal from a second terminal addressed to a broadcast address which does not specify a particular terminal, said signal including beacon information, and detecting whether or not a terminal-authorization-certificate for a network that is shared by a plurality of terminals including the terminal is present at the second terminal based on the beacon information; and
when the terminal determines that the terminal-authorization-certificate is not present at the second terminal, transmitting a suggestion message prompting the second terminal request the terminal-authorization-certificate, wherein the terminal authorization-certificate is used by each of the plurality of terminals to determine access rights to the network, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

24. The method according to claim 23, further comprising the step of obtaining terminal identification information of the second terminal from the signal from the other terminal, wherein the suggestion message is transmitted based on the terminal identification information.

25. A method, implemented on a terminal, for suggesting issuance of a terminal-authorization-certificate, comprising the steps of:

receiving, at the terminal, a signal from a second terminal addressed to a broadcast address which does not specify a particular terminal, said signal including beacon information, and detecting whether or not a terminal-authorization-certificate for a network that is shared by a plurality of terminals including the terminal is present at the second terminal based on the beacon information, the terminal authorization-certificate being used by each of the plurality of terminals to determine access rights to the network; and when the terminal determines that the terminal-authorization-certificate is not present at the second terminal, issuing a suggestion message to the second terminal that includes the terminal-authorization-certificate that gives access rights to the second terminal to access the network, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

26. A method, implemented on a terminal, for requesting issuance of a terminal-authorization-certificate, comprising the steps of:

transmitting, at the terminal, a signal addressed to a broadcast address which does not specify a particular terminal, said signal including beacon information indicating whether or not a terminal-authorization-certificate is present at the terminal, the terminal-authorization-certificate is for a network that is shared by plurality of terminals and is used by each of the plurality of terminals to determine access rights to the network;

receiving a suggestion message at the terminal from a second terminal, which is among the plurality of terminals, suggesting that the receiving terminal request the a terminal-authorization-certificate, wherein the second terminal detects whether or not the terminal-authorization-certificate is present at the terminal based on the beacon information and transmits the suggestion message when it is determined that the terminal-authorization-certificate is not present at the terminal;

displaying information about the second terminal to prompt confirmation; and requesting the second terminal to issue the terminal-authorization-certificate when the confirmation is successfully performed, and notifying the second terminal of a rejection of the suggestion message when the confirmation is rejected, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

27. A method, implemented on a terminal, for requesting issuance of a terminal-authorization-certificate, comprising the steps of:

transmitting, at the terminal, a signal addressed to a broadcast address which does not specify a particular terminal, said signal including beacon information indicating whether or not a terminal-authorization-certificate is present at the terminal, the terminal-authorization-certificate is for a network that is shared by plurality of terminals and is used by each of the plurality of terminals to determine access rights to the network;

receiving a suggestion message at the receiving terminal from a second terminal, which is among the plurality of terminals, prompting that the receiving terminal request the terminal-authorization-certificate, wherein the second terminal detects whether or not the terminal-authorization-certificate is present at the terminal based on the beacon information and transmits the suggestion message when it is determined that the terminal-authorization-certificate is not present at the terminal;

displaying information about the second terminal to prompt confirmation; and after the confirmation, when the suggestion message includes the terminal-authorization-certificate, receiving the terminal-authorization-certificate, and when the suggestion message does not include the terminal-authorization-certificate, requesting the second terminal to issue the terminal-authorization-certificate, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

28. A method, implemented on a terminal, for requesting issuance of a terminal-authorization-certificate, comprising the steps of:

receiving a signal from a second terminal addressed to a broadcast address which does not specify a particular terminal, said signal including beacon information, and detecting whether or not a terminal-authorization-certificate is present at the second terminal based on the beacon information; and when the terminal detects that the terminal-authorization-certificate is present at the second terminal, requesting the second terminal to issue the terminal-authorization-certificate, which is for a network that is shared by plurality of terminals including the second terminal, and the terminal-authorization-certificate is used by each of the plurality of terminals to determine access rights to the network, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

29. The method according to claim 28, further comprising the step of obtaining terminal identification information of the second terminal from the signal, wherein the requesting is performed based on the terminal identification information.

30. A non-transitory computer readable storage medium encoded with computer executable instructions, which when executed by a terminal, cause the terminal to perform a method comprising:

receiving a signal from a second terminal addressed to a broadcast address which does not specify a particular terminal, said signal including beacon information, and detecting whether or not a terminal-authorization-certificate for a network that is shared by a plurality of terminals including the terminal is present at the second terminal based on the beacon information; and when the terminal determines that the terminal-authorization-certificate is not present at the second terminal, transmitting a suggestion message prompting the second terminal to request the terminal-authorization-certificate, wherein the terminal authorization-certificate is used by each of the plurality of terminals to determine access rights to the network, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

31. A non-transitory computer readable storage medium encoded with computer executable instructions, which when executed by a terminal, cause the terminal to perform a method comprising:

receiving a signal from a second terminal addressed to a broadcast address which does not specify a particular terminal, said signal including beacon information, and detecting whether or not a terminal-authorization-certificate for a network that is shared by a plurality of terminals including the terminal is present at the second terminal based on the beacon information, the terminal authorization-certificate being used by each of the plurality of terminals to determine access rights to the network; and when the terminal determines that the terminal-authorization-certificate is not present at the second terminal, issuing a suggestion message to the second terminal that includes the terminal-authorization-certificate that gives access rights to the second terminal to access the network, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

32. A non-transitory computer readable storage medium encoded with computer executable instructions, which when executed by a terminal, cause the terminal to perform a method comprising:

transmitting a signal addressed to a broadcast address which does not specify a particular terminal, said signal including beacon information indicating whether or not a terminal-authorization-certificate is present at the terminal, the terminal-authorization-certificate is for a network that is shared by plurality of terminals and is used by each of the plurality of terminals to determine access rights to the network;

receiving a suggestion message from a second terminal prompting the terminal to request the a terminal-authorization-certificate, wherein the second terminal detects whether or not the terminal-authorization-certificate is present at the terminal based on the beacon information and transmits the suggestion message when it is determined that the terminal-authorization-certificate is not present at the terminal;

displaying information about the second terminal to prompt confirmation; and requesting the second terminal to issue the terminal-authorization-certificate when the confirmation is successfully performed, and notifying the second terminal of a rejection of the suggestion message when the confirmation is rejected, wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

33. A non-transitory computer readable storage medium encoded with computer executable instructions, which when executed by a terminal, cause the terminal to perform a method comprising:
- transmitting a signal addressed to a broadcast address which does not specify a particular terminal, said signal including beacon information indicating whether or not a terminal-authorization-certificate is present at the terminal, the terminal-authorization-certificate is for a network that is shared by plurality of terminals and is used by each of the plurality of terminals to determine access rights to the network;
- receiving a suggestion message at the terminal from a second terminal prompting the terminal to request the a terminal-authorization-certificate, wherein the second terminal detects whether or not the terminal-authorization-certificate is present at the terminal based on the beacon information and transmits the suggestion message when it is determined that the terminal-authorization-certificate is not present at the terminal;
- displaying information about the second terminal to prompt confirmation; and
- after the confirmation, when the suggestion message includes the terminal-authorization-certificate, receiving the terminal-authorization-certificate, and when the suggestion message does not include the terminal-authorization-certificate, requesting the second terminal to issue the terminal-authorization-certificate,
- wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

34. A non-transitory computer readable storage medium encoded with computer executable instructions, which when executed by a terminal, cause the terminal to perform a method comprising:
- receiving a signal from a second terminal addressed to a broadcast address which does not specify a particular terminal, said signal including beacon information from a second terminal, and detecting whether or not a terminal-authorization-certificate for a network that is shared by a plurality of terminals including the terminal is present at the second terminal based on the beacon information; and
- when the terminal detects that the terminal-authorization-certificate is present at the second terminal, requesting the second terminal to issue the terminal-authorization-certificate for a network that is shared by plurality of terminals including the second terminal, and the terminal-authorization-certificate is used by each of the plurality of terminals to determine access rights to the network,
- wherein one of the plurality of terminals is an issuing terminal which initially provides the terminal-authorization-certificate to at least another of the plurality of terminals when setting up the network, and also provides a public key certificate for verifying ownership of the terminal-authorization-certificate, said terminal-authorization-certificate and public key certificate identifying the issuing terminal and being stored on each of the plurality of terminals in the network such that each of the plurality of terminals is configured to provide the terminal-authorization-certificate to a new terminal seeking to access the network.

* * * * *

UNITED STATES PATENT AND TRADEMARK OFFICE
CERTIFICATE OF CORRECTION

| | |
|---|---|
| PATENT NO. | : 7,797,531 B2 |
| APPLICATION NO. | : 10/508137 |
| DATED | : September 14, 2010 |
| INVENTOR(S) | : Hideyuki Suzuki |

It is certified that error appears in the above-identified patent and that said Letters Patent is hereby corrected as shown below:

On the title page, Item (54), and column 1, the title is incorrect. Item (54) and column 1 should read:

-- (54) WIRELESS AD-HOC COMMUNICATION SYSTEM, TERMINAL, METHOD FOR SUGGESTING ISSUANCE OF ATTRIBUTE CERTIFICATE AND METHOD FOR REQUESTING ISSUANCE OF ATTRIBUTE CERTIFICATE IN THE TERMINAL, AND PROGRAM FOR CAUSING THE TERMINAL TO EXECUTE THE METHODS --

Signed and Sealed this
Twenty-ninth Day of March, 2011

David J. Kappos
*Director of the United States Patent and Trademark Office*